(12) United States Patent
Chan et al.

(10) Patent No.: US 11,372,798 B2
(45) Date of Patent: Jun. 28, 2022

(54) METHODS AND APPARATUS TO TRANSITION DEVICES BETWEEN OPERATIONAL STATES

(71) Applicant: Texas Instruments Incorporated, Dallas, TX (US)

(72) Inventors: Chung San Roger Chan, Coppell, TX (US); T-Pinn Koh, Allen, TX (US); Gary Chard, Murphy, TX (US); Bennett Lau, Plano, TX (US); Adam Rappoport, Grapevine, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/025,757

(22) Filed: Sep. 18, 2020

(65) Prior Publication Data

US 2021/0004346 A1    Jan. 7, 2021

Related U.S. Application Data

(62) Division of application No. 16/286,154, filed on Feb. 26, 2019, now Pat. No. 10,795,850.

(51) Int. Cl.
*G06F 13/42* (2006.01)
*G06F 13/38* (2006.01)
*G06F 1/3296* (2019.01)
*G06F 1/324* (2019.01)
*G06F 1/3209* (2019.01)
(Continued)

(52) U.S. Cl.
CPC ............ *G06F 13/4282* (2013.01); *G06F 1/12* (2013.01); *G06F 1/324* (2013.01); *G06F 1/3209* (2013.01); *G06F 1/3215* (2013.01); *G06F 1/3296* (2013.01); *G06F 13/382* (2013.01)

(58) Field of Classification Search
CPC .. G06F 13/4282; G06F 13/382; G06F 1/3296; G06F 1/324; G06F 1/3209; G06F 1/12; G06F 1/3215
See application file for complete search history.

(56) References Cited

U.S. PATENT DOCUMENTS 5,263,172 A * 11/1993 Olnowich ........... G06F 13/4217
                                                  700/2
5,657,457 A *  8/1997 Gaskins ............. G06F 13/4072
                                                  710/107

(Continued)

OTHER PUBLICATIONS

PCT International Search Report No. PCT/US 2020/019965, dated Feb. 26, 2020, 2 pgs.

(Continued)

*Primary Examiner* — Glenn A. Auve
(74) *Attorney, Agent, or Firm* — Ray A. King; Charles A. Brill; Frank D. Cimino

(57) ABSTRACT

Methods, apparatus, systems and articles of manufacture are disclosed to transition devices between operational modes. An example apparatus comprising: an activity detector configured to be coupled to a communication bus; a communication bus controller coupled to the activity detector; a hardware wakeup controller coupled to the activity detector; a switching circuit coupled to the hardware wakeup controller; a first oscillator coupled to the switching circuit; and a second oscillator the second oscillator coupled to the switching circuit and the hardware wakeup controller.

21 Claims, 11 Drawing Sheets

(51) Int. Cl.
    *G06F 1/3215*     (2019.01)
    *G06F 1/12*     (2006.01)

(56) References Cited

U.S. PATENT DOCUMENTS

| | | |
|---|---|---|
| 5,938,742 A | 8/1999 | Faddell et al. |
| 6,396,167 B1 | 5/2002 | Simburger et al. |
| 8,452,897 B1 | 5/2013 | Fernald et al. |
| 8,572,419 B1 | 10/2013 | Donovan |
| 10,678,556 B2 | 6/2020 | Jang |
| 10,795,850 B2 * | 10/2020 | Chan .................... G06F 1/3296 |
| 2001/0005892 A1 | 6/2001 | Watts, Jr. et al. |
| 2003/0070020 A1 | 4/2003 | Kondo et al. |
| 2008/0307240 A1 | 12/2008 | Dahan et al. |
| 2009/0045945 A1 | 2/2009 | Yeh |
| 2009/0259865 A1 | 10/2009 | Sheynblat et al. |
| 2011/0145459 A1 | 6/2011 | Conti et al. |
| 2013/0083829 A1 | 4/2013 | de Ruijter et al. |
| 2015/0081937 A1 | 3/2015 | Wong et al. |
| 2015/0234774 A1 | 8/2015 | Sengoku |
| 2015/0323984 A1 | 11/2015 | Ganton et al. |
| 2016/0176305 A1 | 6/2016 | James et al. |
| 2018/0321725 A1 | 11/2018 | Shao et al. |

OTHER PUBLICATIONS

Office Action for U.S. Appl. No. 15/801,653, dated Jul. 17, 2019, 9 pages.
Search Report for PCT/US18/58825, date of mailing of international search report Feb. 28, 2019, 2 pages.

\* cited by examiner

METHODS AND APPARATUS TO TRANSITION DEVICES BETWEEN OPERATIONAL STATES This application is a divisional of U.S. patent application Ser. No. 16/286,154, filed Feb. 26, 2019, the contents of which are herein incorporated by reference in its entirety.

FIELD OF THE DISCLOSURE

This disclosure relates generally to devices having device operational states, and, more particularly, to methods and apparatus to transition devices between operational states.

BACKGROUND

Various types of Universal Serial Bus (USB) protocols are in use. USB Type-C® (USB-C®) provides a number of advantages over USB Type-A and USB-B including increased functionality over a single port. USB-C® connectors are reversable and the USB-C specification provides protocols for High Definition Multimedia Interface (HDMI), Video Graphics Array (VGA), DisplayPort, and other types of connections from a single port. The USB-C® specification also provides Power Delivery (PD) protocols to facilitate PD capabilities.

BRIEF DESCRIPTION OF THE DRAWINGS

The figures are not to scale. In general, the same reference numbers will be used throughout the drawing(s) and accompanying written description to refer to the same or like parts.

Figure 1:
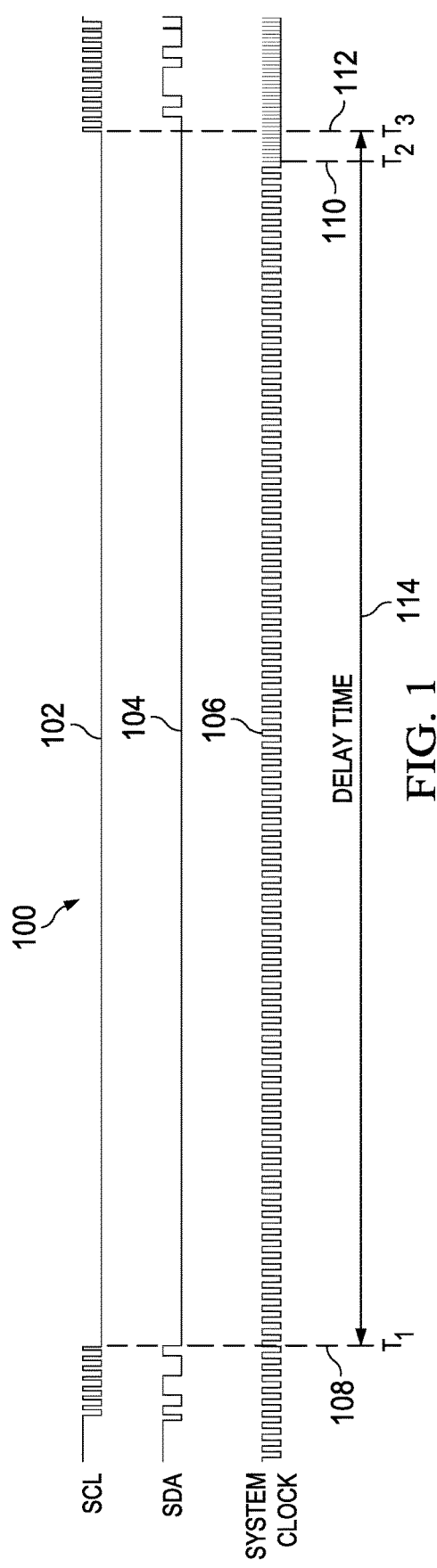
FIG. 1 is a timing diagram showing wakeup time for alternative methods.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Certain examples disclosed herein increase the functionality of a power delivery controller by switching a system clock from a first oscillator to a second oscillator using a hardware wakeup controller and decreasing the amount of time that elapses when transitioning between a first operational mode and a second operational mode. An example apparatus comprising: an activity detector including first and second inputs and first and second outputs, the second output configured to be coupled to a communication bus; a communication bus controller including an output, the output of the communication bus controller coupled to the first input of the activity detector; a hardware wakeup controller including first and second inputs and first, second, and third outputs, the first output of the hardware wakeup controller coupled to the second input of the activity detector and the first output of the activity detector coupled to the second input of the hardware wakeup controller; a switching circuit including first, second, and third inputs, and an output, the output of the switching circuit coupled to the first input of the hardware wakeup controller and the second output of the hardware wakeup controller coupled to the first input of the switching circuit; a first oscillator including an output, the output of the first oscillator coupled to the second input of the switching circuit; and a second oscillator including an input and an output, the output of the second oscillator coupled to the third input of the switching circuit and the input of the second oscillator coupled to the third output of the hardware wakeup controller.

With the increased use of USB-C® capable systems, many device manufacturers have designed devices to take advantage of the functionality of the USB-C® specification. Devices that utilize the USB-C® specification may be laptop computers, desktop computers, power supplies, televisions, speaker systems, etc. For example, a laptop computer with a USB-C® port includes a USB-C® controller. In the example, the laptop computer is a host device to USB-C controller. The USB-C® controller controls USB-C communications and data transfer via a USB-C® port. Any device (e.g., another laptop computer, a desktop computer, a cellular phone, a tablet computer, etc.) that connects to the laptop computer is a secondary device to the host device (e.g., the laptop computer). In some examples, the USB-C® controller is a designated PD controller that is configured to handle PD communications and PD protocols.

Devices including USB-C® PD controllers allow for better power delivery and prevent unnecessary loss of power. To accomplish reduced power loss, many devices will enter a deep sleep mode. For example, when a laptop computer is inactive for a specified amount of time, the laptop computer will enter a deep sleep mode by slowing the speed of a processor of the laptop computer. The processor of the laptop computer executes less frequently while the laptop computer is in the deep sleep mode because the speed of the processor is reduced. The reduced speed of the processor reduces the power consumption of the laptop computer. In addition, the USB-C® PD controller of the host device (e.g., the laptop computer) enters a deep sleep mode when the host device is inactive or when the USB-C® port is not in use. The USB-C® PD controller enters the deep sleep mode to reduce the power consumption of the host device. The USB-C® PD controller switches the system clock of the USB-C® PD controller from a first active clock speed to a second slow clock speed that reduces the frequency that the USB-C® PD controller executes. For example, a PD controller has an active clock speed of, for example, 12 megahertz (MHz), however, when the USB-C® PD controller enters a deep sleep mode, the clock speed is changed to a sleep clock speed, for example, 100 kilohertz (kHz). When the USB-C® PD controller utilizes a reduced sleep clock speed, the PD controller consumes less power thereby conserving, for example, battery resources. The reduced sleep clock speed provides for less power consumption while in sleep mode.

Many different signals may cause the PD controller to transition from a deep sleep mode of operation to an active mode of operation, such as, for example, I2C communication over the I2C communication bus, PD communication on receiver and transmitter (R/T) lines, and/or communication on the general purpose input output (GPIO) lines. I2C communication is a commonly used communication protocol to allow for communications between processors/controllers and peripheral devices (e.g., integrated circuits, other controllers, sensors, etc.). I2C is an advantageous over other communication protocols because the I2C communication protocol only required two wires to form the I2C communication bus and facilitate communications between devices connected to the I2C communication bus. The I2C communication bus includes the serial clock line (SCL) and the serial data line (SDA). The SCL line facilitates a synchronized clock signal between a host device and integrated circuits controlled by the host device over the I2C communication bus. The SDA line facilitates data communication between the host device and integrated circuits controlled by the host device. For example, if a host device wakes up from a deep sleep mode, the host device cannot communicate with a PD controller until the PD controller has also woken up from the deep sleep mode.

The I2C communication bus includes the SCL line and the SDA line. When no devices are communicating over the SCL or SDA lines, the SCL and SDA lines are at logic high values. When a host device (e.g., a laptop computer) wishes to communicate with a PD controller connected to the I2C communication bus, the host device sends the PD controller a start condition followed by the address that corresponds to the PD controller on the I2C communication bus.

In some examples, the host device (e.g., a laptop, a requesting device, etc.) sends communications over the I2C communication bus that include requested actions for the PD controller. When the PD controller obtains the requested action, the PD controller takes control of the I2C communication bus by pulling the SCL line to a logic low value. The SCL line will not be released by the PD controller until the PD controller receives a stop condition from host device. In some examples, the host device may wait for a response from the PD controller to confirm that the requested action has been completed before the host device sends the PD controller a stop condition. In these cases, the SCL line is held at a logic low value for the entire time that the PD controller is carrying out the requested action. This prevents the host device from communicating with other devices (e.g., integrated circuits, other controllers, sensors, data acquisition units, etc.) on the I2C communication bus.

When a PD controller is in a deep sleep mode and obtains a communication from the host device on the I2C communication bus, the PD controller must transition from the deep sleep mode of operation to an active mode of operation before sending a confirmation of the requested action. The SCL line is held at a logic low for the entire time that the PD controller wakes up and for the time that the PD controller takes to execute the requested action.

Additionally, in some examples, a PD communication on the R/T lines wakes up a PD controller connected to the R/T lines. PD communications are used to facilitate communication between a host device (e.g., a laptop) and a secondary device (e.g., a power supply) and are the industry standard for communicating between devices in PD applications. A PD communication includes the data of the communication as well as a 64-bit preamble to allow for the device connected to the R/T lines to synchronize with the sending devices clock signal. The PD communication also includes an address, a header, data objects, a cyclic redundancy check (CRC) to check if the communication was received and/or obtained correctly, and an end of packet token to signal the end of the communication. The PD communication may be for example, a requested action from a USB-C device to a PD controller. The preamble of a PD communication is sent at a frequency of 300 kilohertz (kHz). The preamble of a PD communication is transmitted in about 213 microseconds (µs). If a PD controller does not obtain the parts of the PD communication other than the preamble, the PD controller may not be able to fully obtain the PD communication and/or carry out the requested action. This can cause errors in the PD controller and can also increase the time it takes to carry out request actions.

In some examples, the PD controller is in a deep sleep mode to conserve power while the PD controller is not in use. Traditionally, when the PD controller obtains a communication on the PD communication bus, the PD controller is triggered to transition from a first mode of operation (e.g., the deep sleep mode of operation) to a second mode of operation (e.g., the active mode of operation). Typically, software and/or firmware is used to transition the PD controller from the deep sleep mode of operation to the active mode of operation. The software and/or firmware executes streamlined code to switch the system clock from the sleep clock speed to the active clock speed. For example, a PD controller includes a system clock at a sleep clock speed of 100 kHz and when the PD controller obtains a communication on a PD communication bus, the PD controller switches the system clock from the sleep clock speed to the active clock speed of, for example, 12 MHz. Although the software and/or firmware is streamlined, the software and/or firmware takes a significant amount of time to execute because the software and/or firmware executes each step in the code to switch the system clock from the sleep clock speed to the active clock speed at the slow clock speed. If the PD controller is too slow in waking up, PD communications sent to it over the PD communication bus may be lost because the PD controller is unable to obtain these communications while it is switching between a slow clock speed to an active clock speed.

FIG. 1 is a timing diagram 100 showing wakeup time for alternative methods. The timing diagram 100 illustrates the amount of time taken to switch the system clock of a PD controller from the sleep clock speed to the active clock speed. The timing diagram 100 illustrates an example communication over the I2C communication bus. The timing diagram 100 includes a signal plot 102, a signal plot 104, a signal plot 106, a time 108 ($T_1$), a time 110 ($T_2$), a time 112 ($T_3$) and a delay time 114. The example signal plot 102 shows the SCL line from a laptop computer to a PD controller. The signal plot 102 shows the clock signal between the laptop and the PD controller. When the PD controller obtains an I2C communication from the laptop directed at the PD controller, the PD controller will pull the clock signal to a logic low value while the PD controller switches the system clock of the PD controller from the sleep clock speed to the active clock speed.

The signal plot 104 is the SDA line. The signal plot 104 shows an I2C communication from the laptop to the PD controller. The laptop sends a communication to the PD controller over the SDA line. In the example, the communication of the SDA line is a binary representation of an address that corresponds to the PD controller. Upon obtaining the communication (e.g., address), the PD controller pulls the clock signal on the SCL line to a logic low value.

The signal plot 106 is the system clock signal of the PD controller that illustrates the switching between the sleep clock speed and the active clock speed. Before the PD controller obtains the I2C communication on the SDA line, the system clock signal operates at the sleep clock speed. The system clock signal of the PD controller remains at the sleep clock speed while the system clock switches from the sleep clock speed to the active clock speed.

In the example, the laptop transmits a start condition to the PD controller. The PD controller obtains an I2C communication from the laptop. At the time 108 $T_1$, after the PD controller processes the I2C communication, the PD controller pulls the SCL line low, preventing the laptop from communicating with other integrated circuits on the I2C communication bus. The time 108 $T_1$ is at 7.412 ms. At the time 110 $T_2$, the PD controller has switched the system clock of the PD controller from the sleep clock speed to the active clock speed. The time 110 $T_2$ is at 8.421 ms. After the time 110 $T_2$, the system clock signal of the PD controller is at the active clock speed. The time 112 $T_3$ is at 8.443 ms. At the time 112 $T_3$, the PD controller releases control of the SCL line and the laptop is able to communicate with other integrated circuits connected to the I2C communication bus.

The time between the PD controller pulling the SCL line low (time 108) and the time that the PD controller releases the SCL line (time 112) is the delay time 114. In the example the delay time 114 is 1.1 ms. The delay time 114 is extended to 1.1 ms because the steps to switch the system clock from the sleep clock speed to the active clock speed are executed by software and/or firmware of the PD controller. The software and/or firmware of the PD controller executes the steps to switch the PD controller system clock signal speed at the sleep clock speed and thus is burdened by the slower speed of the sleep clock. In the example, switching the PD controller system clock signal at the sleep clock speed prevents the laptops from communicating with other integrated circuits on the I2C communication bus and slows the overall performance of the laptop. Additionally, the extended delay time 114 increases the power loss of the PD controller while it is switching from the PD controller system clock signal speed from the sleep clock speed to the active clock speed.

Figure 2:
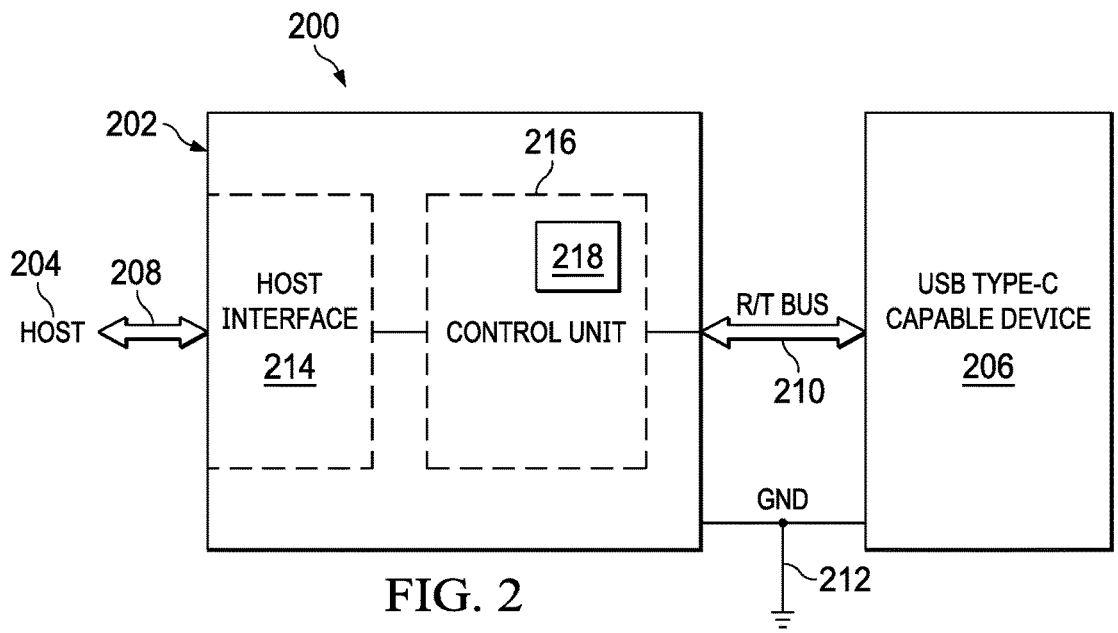
FIG. 2 is schematic of an example environment in which a power delivery controller is connected to a host device and a USB-C® capable device.

FIG. 2 is a schematic of an example environment 200 where a power delivery controller 202 is connected to a host device 204 and a USB-C® capable device 206. The environment 200 includes the power delivery controller 202, the host device 204, and the USB-C® capable device 206. The power delivery controller 202 is coupled to the host device 204 via the communication bus 208. The example communication bus 208 facilitates communications between the host device 204 and the power delivery controller 202 via I2C communications, GPIO communications, Power Delivery communications, etc. The communication bus 208 is for example an I2C communication bus. In other examples, the communication bus 208 is a GPIO communication bus (e.g., a general purpose input output communication bus). The power delivery controller 202 is coupled to the USB-C® capable device 206 via the R/T communication bus 210 (e.g., a power delivery communication bus). The example power delivery controller 202 and the example USB-C® capable device 206 are also coupled to the ground node 212 (GND).

The example power delivery controller 202 is a device that controls interactions between the host device 204 and the USB-C® capable device 206 via a USB-C® port. The example power delivery controller 202 includes a host interface 214, a control unit 216. The control unit 216 includes a wakeup circuit 218. The example host interface 214 is a port that facilitates communications between the host device 204 and the power delivery controller 202. The host interface 214 is coupled to the communication bus 208 and the control unit 216. The example host interface 214 provides status information about the power delivery controller 202, allows for the host device 204 to control the power delivery controller 202, etc. The example host device 204 is a laptop computer. Alternatively, the host device 204 may be a desktop computer, a cellular phone, a power supply, etc.

The example control unit 216 is a control unit within the power delivery controller 202. The control unit 216 detects that a USB-C® capable device 206 has connected to the host device 204 and facilitates communication between the host device 204 and the USB-C® capable device 206 to establish the expected power output and/or input from the USB-C® capable device and/or the host device 204. The example control unit 216 also configures the power delivery controller 202 for the established expected power output and/or input to control the power that is delivered. Additionally, the control unit 216 responds to requests from the host device 204 and the USB-C® capable device 206. The control unit 216 facilitates communications between the host device 204 and the USB-C® capable device. Additionally, the control unit 216 controls additional integrated circuits connected to the control unit 216.

The example control unit 216 includes the wakeup circuit 218. In the illustrated example, the wakeup circuit 218 is a logic circuit that controls the switching of a system clock in the control unit 216, and more generally in the power delivery controller 202, from a sleep clock speed to an active clock speed. The wakeup circuit 218 may additionally be configured to switch the system clock from the active clock speed to the sleep clock speed.

In the illustrated example of FIG. 2, the host device 204 and/or the USB-C® capable device 206 sends a communication to the power delivery controller 202 over the communication bus 208 and/or the R/T communication bus 210. In the example, the power delivery controller 202 is in sleep mode. If the power delivery controller 202 obtains the communication over the communication bus 208, the host interface 214 instructs the control unit 216 to transition the power delivery controller 202 from a first mode of operation (e.g., a deep sleep mode of operation) to a second mode of operation (e.g., an active mode of operation). If the power delivery controller 202 obtains the communication over the R/T communication bus 210, the control unit 216 wakes up the power delivery controller 202. The control unit 216 wakes up the power delivery controller 202 by utilizing the wakeup circuit 218. The wakeup circuit 218 switches the system clock of the control unit 216 and more generally in the power delivery controller 202 from the sleep clock speed to the active clock speed. The wakeup circuit 218, by switching the system clock of the control unit 216 from the sleep clock speed to the active clock speed, wakes up the power delivery controller 202 and removes the power delivery controller 202 from the sleep mode.

Figure 3:
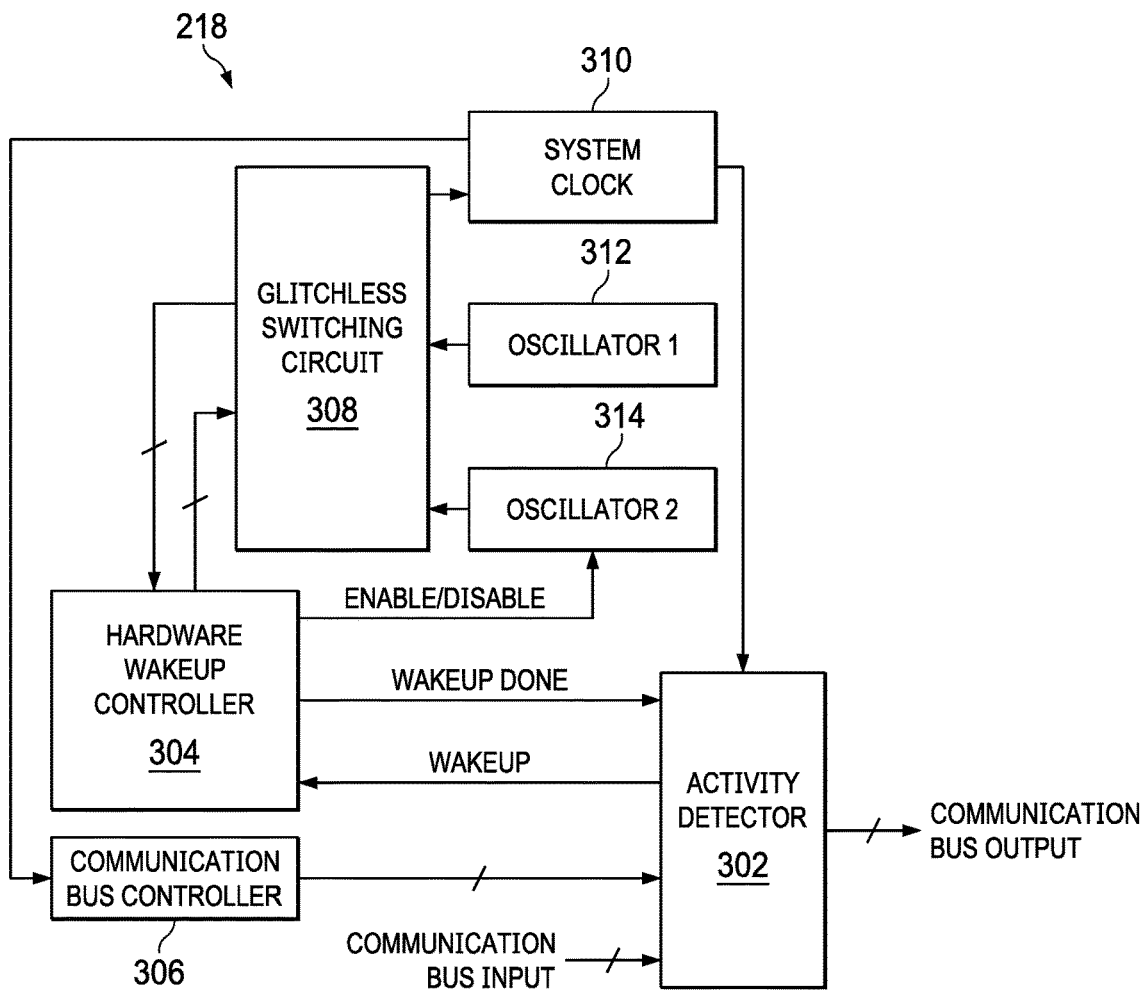
FIG. 3 is schematic of an example wakeup circuit of the power delivery controller of FIG. 2.

FIG. 3 is a schematic of an example wakeup circuit 218 of the control unit 216 of FIG. 2. The example wakeup circuit 218 includes an activity detector 302, a hardware wakeup controller 304, a communication bus controller 306, a glitchless switching circuit 308, a system clock 310, a first oscillator 312, and a second oscillator 314. In the example, the activity detector 302 is coupled to the hardware wakeup controller 304, the communication bus controller 306, a communication bus input, a communication bus output and the system clock 310. The example hardware wakeup controller 304 is coupled to the example glitchless switching circuit 308, the example activity detector 302, and the example second oscillator 314. The example glitchless switching circuit 308 is coupled to the example hardware wakeup controller 304, the example system clock 310, the example first oscillator 312, and the example second oscillator 314. The example system clock 310 is coupled to the example activity detector 302, the glitchless switching circuit 308, and the example communication bus controller 306. The example first oscillator 312 is coupled to the example glitchless switching circuit 308. The example second oscillator 314 is coupled to the example glitchless switching circuit 308. The example communication bus controller 306 is coupled to the example system clock 310 and the example activity detector 302.

As used herein, "glitchless" refers to functionality that ensures no damaging glitches occur in a system. For example, "glitchless" refers to preventing switching between one or more oscillators during a logic high value on more than one of the one or more oscillators, cutting off a logic high value on any of the one or more oscillators, creating a shortened pulse on a system clock, or any other type of unintended behavior on the one or more oscillators or a system clock. In this manner, while there may be potentially minor, incidental, and/or undamaging glitches in a system, the term "glitchless" as used herein may still be used to describe such functionality.

In the illustrated example, the activity detector 302 is a logic circuit that detects an activity on the communication bus input and generates an interrupt to send to the hardware wakeup controller 304. In some examples, the activity detector 302 is an I2C activity detector. In other examples, the activity detector 302 is a power delivery activity detector. In further examples, the activity detector 302 is a GPIO activity detector (e.g., a general purpose input output activity detector). The example activity detector 302 also notifies the host device 204 and/or the USB-C® capable device 206 of the wakeup status of the power delivery controller 202 via the host interface 214 and the communication bus 208 and/or the R/T communication bus 210. In the example, the activity detector 302 is coupled to a communication bus, via the communication bus input and the communication bus output, the communication bus controller 306, and the hardware wakeup controller 304. In some examples, the communication bus is the communication bus 208. In other examples, the communication bus is the R/T communication bus 210. The activity detector 302 operates at the speed of the system clock 310.

In the illustrated example, the hardware wakeup controller 304 is a hardware state machine that controls switching the system clock 310 from the first oscillator 312 to the second oscillator 314. Because the hardware wakeup controller 304 is a hardware state machine, it is not dependent on the system clock 310 to operate. In response to obtaining the notification generated by the activity detector 302, the hardware wakeup controller 304 enables the second oscillator 314. For example, the hardware wakeup controller 304, in response to obtaining the notification generated by the activity detector 302 writes a logic high value to the second oscillator 314. The example hardware wakeup controller 304 additionally sends a signal to the glitchless switching circuit 308 to initiate switching the system clock 310 from the first oscillator 312 to the second oscillator 314. In response to a logic high value from the glitchless switching circuit 308, the example hardware wakeup controller 304 determines that safe operation of the example power delivery controller 202 is possible with the second oscillator 314 connected to the system clock 310. The example hardware wakeup controller 304 also sends a signal to the example glitchless switching circuit 308 to switch the system clock 310 from the first oscillator 312 to the second oscillator 314. Once the hardware wakeup controller 304, via the glitchless switching circuit 308, switches the system clock 310 from the first oscillator 312 to the second oscillator 314, the hardware wakeup controller 304 transmits a signal to the activity detector 302 that indicates the power delivery controller 202 is awake.

In the illustrated example, the communication bus controller 306 is a logic circuit that facilitates control of the activity detector 302 and supplies the activity detector 302 with the signals that the activity detector 302 uses in operation. In some examples, the communication bus controller 306 supplies the activity detector 302 with an enable and/or disable signal. In other examples, the communication bus controller 306 supplies the activity detector 302 with an address corresponding to the address of the power delivery controller 202.

In the illustrated example, the glitchless switching circuit 308 is a logic circuit that facilitates switching the system clock 310 from the first oscillator 312 to the second oscillator 314. For example, the glitchless switching circuit 308 is a multiplexer that the hardware wakeup controller 304 utilizes to switch the system clock 310 from the first oscillator 312 to the second oscillator 314. In other examples, the glitchless switching circuit 308 may be referred to as a switching circuit. The hardware wakeup controller 304, via the glitchless switching circuit 308, delays the switching of the first oscillator 312 and the second oscillator 314 until there is a rising edge on the signal of the second oscillator 314. The delay until there is a rising edge on the signal of the second oscillator 314 allows for minimal effect on the duty cycle of the system clock 310 and ensures that no glitches will occur from improper clock signals on the system clock 310. In the illustrated example, the system clock 310 provides a common connection between all devices (e.g., the activity detector 302, the communication bus controller 306, etc.) that are connected to the system clock 310.

In other examples, the system clock 310 is a circuit that converts the signal generated from either the first oscillator 312 or the second oscillator 314 to generate the clock signal. In such other examples, the system clock 310 also feeds the signal generated by either the first oscillator 312 or the second oscillator 314 back to the first oscillator 312 or the second oscillator 314 to maintain the oscillation of the first oscillator 312 or the second oscillator 314. In such other examples, the system clock 310 converts a sine wave signal generated by the example first oscillator 312 and/or the example second oscillator 314. Alternatively, in such other examples, the system clock 310 amplifies the signal generated by the first oscillator 312 or the second oscillator 314 by inverting the signal and feeding a portion of the signal back into the first oscillator 312 or the second oscillator 314 to maintain oscillation. In such other examples, the system clock 310 incorporates logic to convert the basic duty cycle generated by the first oscillator 312 or the second oscillator 314 to another duty cycle that is required by an application. It will be appreciated that any type of system clock may be used depending on the application and/or the oscillating element used to implement the first oscillator 312 and the second oscillator 314.

In the illustrated example, the first oscillator 312 is a resistor capacitor (RC) oscillator that generates a square wave output at a particular frequency that is trimmable (e.g., with an adjustable resonant frequency). In the illustrated example, the second oscillator 314 is a frequency lock loop. For example, the first oscillator 312 is an RC inverter oscillator and the frequency of the second oscillator 314 is set by a ring oscillator included in the frequency lock loop. In other examples, the first oscillator 312 and the second oscillator 314 are relaxation oscillators, harmonic oscillators (e.g., feedback oscillators, negative-resistance oscillators, etc.), or voltage-controlled oscillators or any combination thereof. Regardless of the type of the first oscillator 312 and the type of the second oscillator 314, the first oscillator 312 is set at first frequency and the second oscillator 314 is set at a second frequency. For example, the first oscillator 312 oscillates at a first frequency (e.g., 100 kHz) and the second oscillator 314 oscillates at a second frequency (e.g., 12 MHz). In the illustrated example, the first oscillator 312 is enabled. In other examples, the first oscillator 312 includes the functionality to be enabled and/or disabled. In the illustrated example, the second oscillator 314 includes the functionality to be enabled and/or disabled. Alternatively, the first oscillator 312 and the second oscillator 314 may be crystal oscillators that generate a precise frequency on a vibrating crystal by using the mechanical resonance of a piezoelectric material and/or an inductor capacitor (LC) oscillator that generates an oscillating signal at a precise frequency that can be used to control a logical device such as the power delivery controller 202. It will be appreciated that any type of oscillating element may be used to generate the first signal and the second signal and that the types of oscillating elements available are not limited to examples disclosed herein.

In the illustrated example of FIG. 3, the activity detector 302 receives and/or obtains a communication from the communication bus. The communication bus input is, for example, the communication bus 208 coupled to the activity detector 302 via the host interface 214. In other examples, the communication bus is the R/T communication bus 210. In the illustrated example, the communication is a requested action from the host device 204 and/or the USB-C® capable device 206 directed at the power delivery controller 202 and/or the control unit 216. The requested action is, for example, a request to the power delivery controller 202 from the host device 204 to respond to the host device 204 in order to be further commanded by the host device 204. In other examples, the requested action is a transaction between the control unit 216 and the USB-C® capable device. For example, the requested action is a request to negotiate a new USB-C® contract (e.g., a new Universal Serial Bus Type C® contract). In order to detect the requested action, the activity detector 302 obtains signals that the activity detector 302 utilizes to operate from the communication bus controller 306. In some examples, the communication bus controller 306 supplies the activity detector 302 with an enable and/or disable signal. In other examples, the communication bus controller 306 supplies the activity detector 302 with an address corresponding to the address of the power delivery controller 202. In response to detecting a request on the communication bus directed at the power delivery controller 202 and/or the control unit 216, the activity detector 302 generates a first notification that indicates that the requested action is directed at the power delivery controller 202 and/or control unit 216. The activity detector 302, sends the first notification to the hardware wakeup controller 304. In response to detecting the first notification from the activity detector 302, the hardware wakeup controller 304 switches the system clock 310 from the first oscillator 312 to the second oscillator 314. The hardware wakeup controller 304 utilizes the glitchless switching circuit 308 to switch the system clock 310 from the first oscillator 312 to the second oscillator 314.

The hardware wakeup controller 304 enables the second oscillator 314. In other words, the hardware wakeup controller 304 applies a voltage to the second oscillator 314, the voltage indicating a logic high value that enables the second oscillator 314. The hardware wakeup controller 304 additionally sends a signal to the glitchless switching circuit 308 to initiate switching the system clock 310 from the first oscillator 312 to the second oscillator 314. The hardware wakeup controller 304, via the glitchless switching circuit 308, monitors the second oscillator 314 for stabilization as on. In other words, the hardware wakeup controller 304 monitors the second oscillator 314 to determine that the second oscillator 314 is oscillating at the second frequency (e.g., 12 MHz). The hardware wakeup controller 304 monitors the second oscillator 314, via the glitchless switching circuit 308, by waiting for the second oscillator 314 to reach the second frequency. The hardware wakeup controller 304, via the glitchless switching circuit 308 waits for a rising edge of the second signal generated by the second oscillator 314 to switch the system clock 310 to the second oscillator 314. This ensures that there will be no glitches (e.g., switching between the first oscillator 312 and the second oscillator 314 during a logic high value, cutting off a logic high value on either the first oscillator 312 or the second oscillator 314, creating a shortened pulse on the system clock 310), and that there is no effect on the duty cycle of the system clock signal of the power delivery controller 202. After the hardware wakeup controller 304 switches, via the glitchless switching circuit 308, the system clock 310 from the first oscillator 312 to the second oscillator 314, the hardware wakeup controller 304 transmits a signal to the activity detector 302 that indicates the system clock 310 has been changed from the first oscillator 312 at the first frequency to the second oscillator 314 at the second frequency.

The activity detector 302 notifies the host device 204 and/or the USB-C® capable device 206 of the status of the power delivery controller 202 via the host interface 214 and the communication bus 208 and/or the R/T communication bus 210. In some examples, the activity detector 302 regenerates the address of the power delivery controller 202 and transmits a second notification including the address of the power delivery controller 202 and sends the address to the host device 204. In other examples, the activity detector 302 transmits a second notification to the USB-C® capable device 206 that indicates the control unit 216 is awake and ready to complete the requested transaction.

Figure 4:
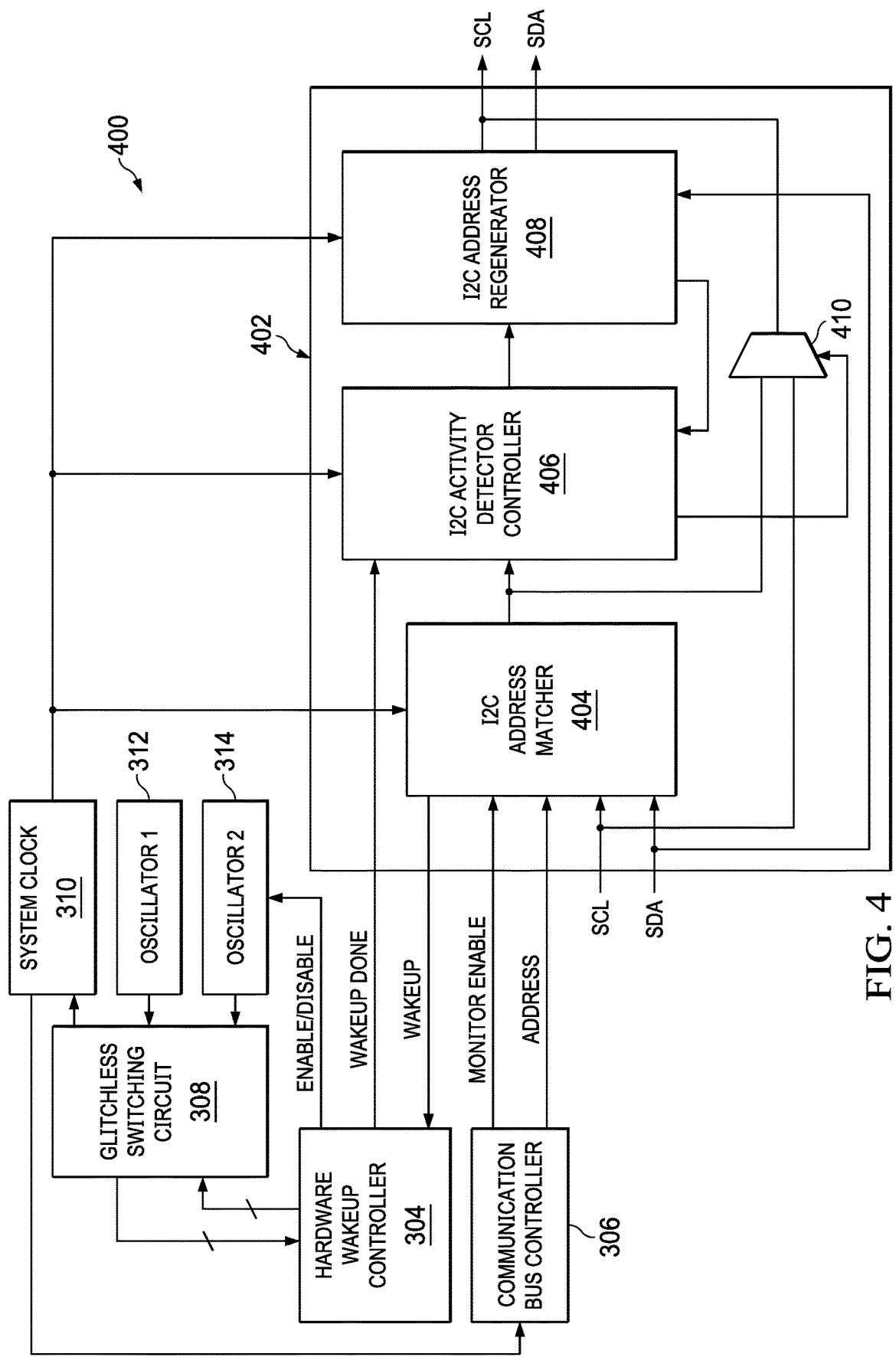
FIG. 4 is an alternate example wakeup circuit including an I2C activity detector.

FIG. 4 is an alternate example wakeup circuit including an I2C activity detector. The wakeup circuit 400 of FIG. 4 includes the same elements of the wakeup circuit 218 of FIG. 3. In the example of FIG. 4, the wakeup circuit 400 includes an I2C activity detector 402, the hardware wakeup controller 304, the communication bus controller 306, the glitchless switching circuit 308, the system clock 310, the first oscillator 312, and the second oscillator 314. The example hardware wakeup controller 304, the example communication bus controller 306, the example glitchless switching circuit 308, the example system clock 310, the example first oscillator 312, and example the second oscillator 314 operate as discussed in connection with FIG. 3. Henceforth, the example hardware wakeup controller 304, the example communication bus controller 306, the example glitchless switching circuit 308, the example system clock 310, the example first oscillator 312, and example the second oscillator 314 will not be discussed further except for interactions with the I2C activity detector 402.

The example I2C activity detector 402 includes an example I2C address matcher 404, an example I2C activity detector controller 406, an example I2C address regenerator 408, and an example multiplexer 410.

In the illustrated example, the I2C address matcher 404 is coupled to the communication bus controller 306, the hardware wakeup controller 304, the I2C activity detector controller 406, a communication bus, the system clock 310, and the multiplexer 410. In the example, the communication bus is the communication bus 208. The example communication bus 208 is a I2C communication bus including SCL lines and SDA lines. The SCL line facilitates a clock signal between the host device 204 and the I2C activity detector 402. The clock signal is an alternating signal generated by the host device 204 that allows the host device 204 to control multiple devices connected to it (e.g., the power delivery controller 202). When each device is being controlled by the host device 204, the device (e.g., the power delivery controller 202) pulls the SCL line low. The SCL line functions to notify as a method of communication between integrated circuits connected on the I2C communication bus and does not necessarily set the clock rate for the integrated circuits connected to the I2C communication bus. In the example, the I2C address matcher 404 operates on the system clock 310. The SDA line facilitates data transmission between the host device 204 and the I2C activity detector 402. In the illustrated example, the I2C address matcher 404 is a logic circuit that determines whether an address received from the host device 204 matches an address of the power delivery controller 202. In the example, the I2C address matcher 404 includes a comparator that compares the address of the power delivery controller 202 to the address obtained on the I2C communication bus. The example I2C address matcher 404 sends a notification to the hardware wakeup controller 304 that indicates a request obtained by the I2C activity detector 402 from the host device 204 is directed at the power delivery controller 202.

In the illustrated example, the I2C address matcher 404 receives an enable signal from the communication bus controller 306 indicating that the I2C address matcher 404 is to monitor the I2C communication bus for addresses. The example I2C address matcher 404 receives and/or obtains an address on the SDA line that was broadcast by the host device 204. The address corresponds to devices connected to the communication bus 208. In the example, the I2C address matcher 404 obtains the address corresponding to the power delivery controller 202 from the communication bus controller 306. In the example, if the address obtained from the host device 204 by the I2C address matcher 404 matches the address obtained from the communication bus controller 306 by the I2C address matcher 404, the I2C address matcher 404 generates a first notification that indicates that the host device 204 has requested the power delivery controller 202 to fulfill a task. The task is, for example, requesting a power delivery contract request to a power supply (e.g., a new USB-C contract). The I2C address matcher 404 sends the first notification to the hardware wakeup controller 304, the I2C activity detector controller 406, and the multiplexer 410.

In the illustrated example, the I2C address matcher 404 pulls the SCL clock signal low. When the I2C address matcher 404 pulls the SCL clock signal low, the I2C address matcher 404 shorts the clock signal on the SCL line to ground or to a logic low value. The I2C address matcher 404 may short the clock signal to a logic low value by utilizing a transistor to change the SCL line from the clock signal to an artificially logic low signal. Alternatively, the I2C address matcher 404 may pull the clock signal on the SCL line to low using a multiplexer.

In the illustrated example of FIG. 4, the example I2C activity detector controller 406 is a device that controls the I2C activity detector 402. The example I2C activity detector controller 406 is coupled to the hardware wakeup controller 304, the I2C address matcher 404, the I2C address regenerator 408, the system clock 310, and the multiplexer 410. In the example, the I2C activity detector controller 406 is an electronic device that executes instructions at the speed of the system clock 310 to detect activity on the I2C communication bus. Alternatively, the I2C activity detector controller 406 may be a sequencer, a microcontroller unit, a state machine, etc. In the example, the I2C activity detector controller 406 obtains the first notification from the I2C address matcher 404. The first notification from the I2C address matcher 404 indicates that the I2C address matcher 404 has detected an address on the I2C communication bus that matches the address of the power delivery controller 202. In response to obtaining the first notification, the I2C activity detector controller 406 sends a control signal to the multiplexer 410 to switch the output of the multiplexer 410 from the SCL clock signal to the low clock signal.

In the illustrated example of FIG. 4, the I2C activity detector controller 406 monitors the hardware wakeup controller 304 for a notification indicating that the hardware wakeup controller 304 has, via the glitchless switching circuit 308, switched the system clock 310 from the first oscillator 312 to the second oscillator 314. In response to detecting that the hardware wakeup controller 304 has switched the system clock 310 from the first oscillator 312 to the second oscillator 314, the I2C activity detector controller 406 sends an enable signal to the I2C address regenerator 408. Because the hardware wakeup controller 304 switched the system clock 310 from the first oscillator 312 to the second oscillator 314, the I2C activity detector controller 406 operates at the second frequency (e.g., speed) of the second oscillator 314. In response to detecting that the I2C address regenerator 408 has regenerated the address of the power delivery controller 202, the I2C activity detector controller 406 sends a control signal to the multiplexer 410 to switch the output of the multiplexer 410 from the low clock signal to the high clock signal on the SCL line of the I2C communication bus.

In the illustrated example, the I2C activity detector 402 includes the I2C address regenerator 408. The I2C address regenerator 408 is coupled to the I2C communication bus and the I2C activity detector controller 406. The I2C address regenerator 408 is a logic circuit that regenerates the address that is obtained from the SDA line of the I2C communication bus. The I2C address regenerator 408 obtains the address of the power delivery controller 202 from SDA line of the I2C communication bus. In response to receiving an enable signal from the I2C activity detector controller 406, the I2C address regenerator 408 regenerates the address of the power delivery controller 202 obtained on the I2C communication bus. The I2C address regenerator 408 regenerates the address by generating a start bit to indicate a communication to the host device 204 on the I2C communication bus followed by the address received and/or obtained on the I2C communication bus. In the example, the I2C address regenerator 408 regenerates the address of the power delivery controller 202 between 100 kHz and 600 kHz. After regenerating the address obtained on the SDA line of the I2C communication bus, the I2C address regenerator 408 sends a signal to the I2C activity detector controller 406 that indicates the address obtained on the I2C communication bus has been regenerated. After receiving another enable signal from the I2C activity detector controller 406, the I2C address regenerator 408 transmits a second notification on the SDA line of the I2C communication bus indicating that the I2C activity detector 408 has completed the requested activity from the host device (e.g., completed the requested function). In the example, the second notification is the regenerated address, regenerated from the address obtained on the SDA line of the I2C communication bus. In the example, the requested activity is the act of waking up the power delivery controller 202.

In the illustrated example of FIG. 4, the communication bus controller 306 provides the I2C address matcher 404 with an enable signal indicating that the I2C address matcher is to monitor the I2C communication bus for addresses. Additionally, the communication bus controller 306 supplies the I2C address matcher 404 with the address of the power delivery controller 202. In response to detecting the address obtained from the I2C communication bus by the I2C address matcher 404 matches the address obtained from the communication bus controller 306 by the I2C address matcher 404, the I2C address matcher 404 generates a first notification that indicates that the host device 204 has requested the power delivery controller 202 to fulfill a task. The I2C address matcher 404 also pulls the SCL line low by utilizing a transistor to short the SCL line to ground. The I2C address matcher 404 sends the first notification to the hardware wakeup controller 304, the I2C activity detector controller 406, and the multiplexer 410. The first notification is, for example, a transition from a logic high value to a logic low value.

The hardware wakeup controller 304 obtains the first notification from the I2C address matcher 404 and switches the system clock 310 from the first oscillator 312 to the second oscillator 314 as discussed in connection with FIG. 3. In the example, the hardware wakeup controller 304 generates a signal that indicates the system clock 310 has been switched from the first oscillator 312 to the second oscillator 314 and transmits the signal to the I2C activity detector controller 406. In the example, the I2C activity detector controller 406 monitors the hardware wakeup controller 304 for the signal indicating the system clock 310 has been switched from the first oscillator 312 to the second oscillator 314, and in response to detecting the signal, the I2C activity detector controller 406 sends an enable signal to the I2C address regenerator 408. In the example, the I2C activity detector controller 406 monitors the I2C address regenerator 408 for a signal indicating that the I2C address regenerator 408 has regenerated the address received and/or obtained on the SDA line of the I2C communication bus. Additionally, when the I2C activity detector controller 406 obtains the first notification from the I2C address matcher 404, the I2C activity detector controller 406 sends a control signal to the multiplexer 410 to switch the output of the multiplexer 410 from the SCL clock signal to the logic low value.

In the illustrated example, the I2C address regenerator 408 receives and/or obtains an address from the SDA line of the I2C communication bus. The example I2C address regenerator 408 is coupled to the I2C communication bus, the I2C activity detector controller 406, and the system clock 310. The I2C address regenerator 408 monitors the I2C activity detector controller 406 for an enable signal. Because the hardware wakeup controller 304 switched the system clock 310 from the first oscillator 312 to the second oscillator 314, the I2C address regenerator 408 operates at the second frequency (e.g., speed) of the second oscillator 314. In response to detecting an enable signal from the I2C activity detector controller 406, the I2C address regenerator 408 regenerates the address received on the SDA line of the I2C communication bus by first generating a start bit and then generating the address received and/or obtained on the SDA line of the I2C address communication bus. After regenerating the address, the I2C address regenerator 408 sends a signal to the I2C activity detector controller 406 that indicates the address has been regenerated. The I2C activity detector controller 406 sends another enable signal to the I2C address regenerator 408 indicating that the I2C address regenerator 408 is to transmit a second notification over the SDA line of the I2C communication bus. The I2C activity detector controller 406 sends a control signal to the multiplexer 410 to switch the output of the multiplexer 410 from the low clock signal to the SCL clock signal. By switching the output of the multiplexer 410 from the low clock signal to the SCL clock signal, the I2C activity detector controller 406, and more generally, the I2C activity detector 402 releases the SCL line and allows other devices connected to the I2C communication bus to be controlled by the host device 204.

Figure 5:
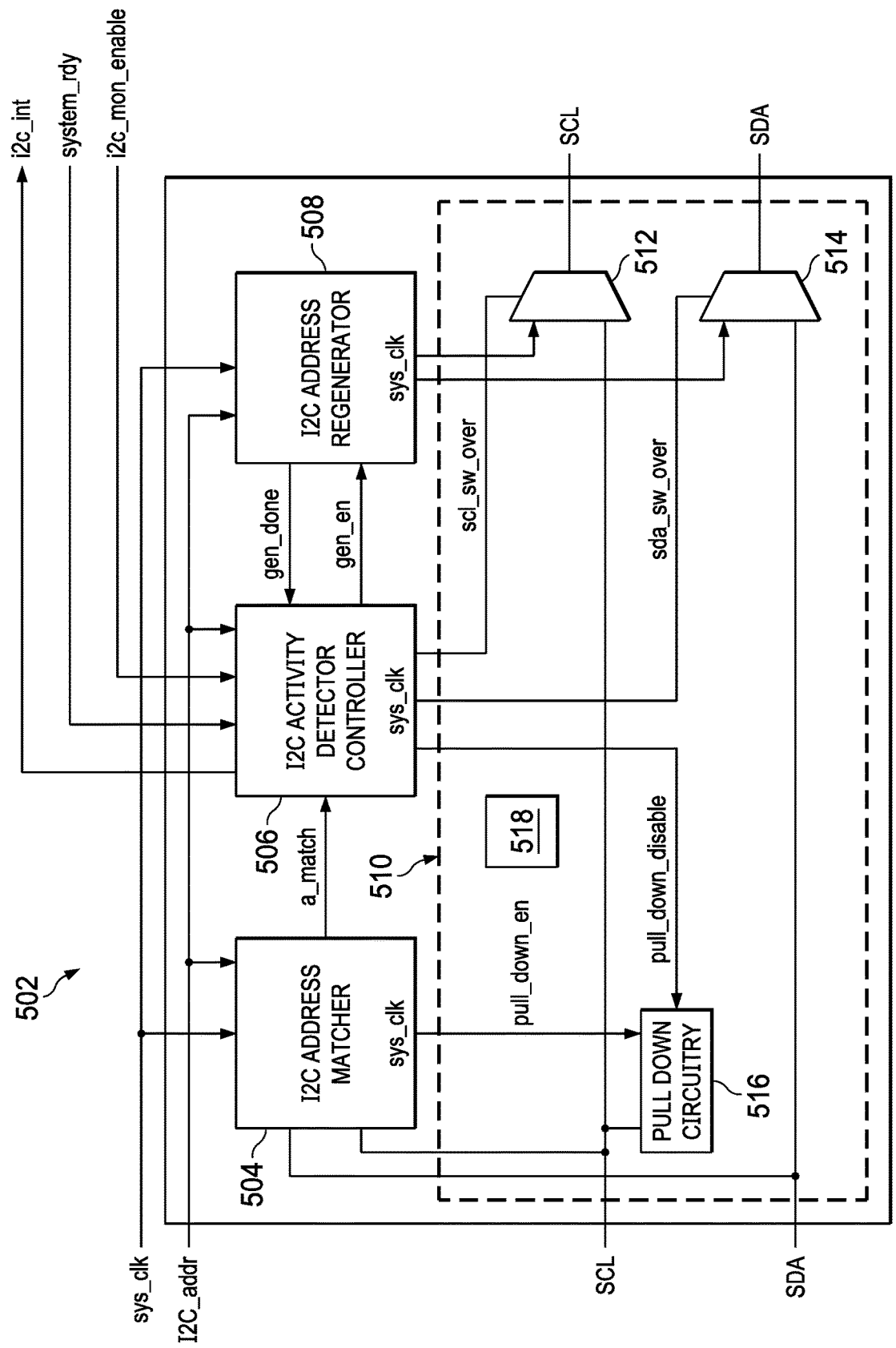
FIG. 5 is an example schematic illustration of an alternative implementation of the I2C activity detector used with the wakeup circuit of FIG. 3.

FIG. 5 is an example schematic illustration of an alternative implementation of the I2C activity detector 502 used with the wakeup circuit 218 of FIG. 3. Example methods and apparatus to monitor activity on a digital bus similar to the above method are disclosed in U.S. patent application Ser. No. 15/801,653, which is hereby incorporated by reference in its entirety.

FIG. 5 illustrates another example I2C activity detector 502 that monitors for an address on a communication bus (e.g., the communication bus 208). In this example, the I2C activity detector 502 includes an I2C address matcher 504, an I2C activity detector controller 506, and an I2C address regenerator 508, and a bus interface 510 that includes a first multiplexer 512, a second multiplexer 514, and a pull down circuitry 516 (e.g., a switch).

The I2C address matcher 504 is coupled to the SCL lines and the SDA line, together forming an I2C bus communication bus, the I2C activity detector controller 506, an I2C address line (i2c_addr) and the pull down circuitry 516. The I2C activity detector 502 includes a non-volatile memory 518 (e.g., a register) that stores a predefined address that is associated with another device (e.g., the power delivery controller 202). In an example, the predefined address is stored in a firmware of the I2C activity detector 502. The I2C address matcher 504 receives addresses from the I2C communication bus, compares these addresses to the predefined address, and determines if one of these addresses received from the I2C communication bus matches the predefined address. Although not shown, there can be numerous devices coupled to the I2C communication bus, each of the devices being addressable with a unique address. In the event that the I2C address matcher 504 matches one of the addresses detected on the I2C communication bus with the stored predefined address, the I2C address matcher 504 outputs an a_match signal to the I2C activity detector controller 506. The I2C address matcher 504 is further coupled to the pull down circuitry 516. Also, in the event that the I2C address matcher 504 detects a match for an address detected on the I2C communication bus with the stored predefined address, the I2C address matcher 504 outputs a pull_down_en signal to enable the pull down circuitry 516. Additionally, in the event that the I2C address matcher 504 detects a match for an address detected on the I2C communication bus with the stored predefined address the I2C activity detector controller 506 outputs a wakeup request, e.g., an i2c_int interrupt signal, to another device to awake the other device from the sleep mode. In an example, the I2C address matcher 504 is implemented with a state machine, which lowers a cost of implementing the I2C activity detector 502 and lowers power requirements of the I2C activity detector 502. The I2C activity detector 502 operates in a very lower power state only consuming leakage power, with the I2C address matcher 504 operating asynchronously with respect to other device on the I2C communication bus via a serial clock signal from the SCL line of the I2C communication bus. Relying on a serial clock signal received on the SCL line of the I2C communication bus and without having to independently generate a clock signal within the I2C activity detector 502, the I2C activity detector 502 operates asynchronously and with less power to perform its address matching functions than if the I2C activity detector 502 had to generate its own clock signal.

The I2C activity detector controller 506 is coupled to the I2C address regenerator 508, the pull down circuitry 516, the first multiplexer 512, the second multiplexer 514, an I2C interrupt line (i2c_int), an system ready line (system_rdy), and an I2C monitor enable line (i2c_mon_enable). The I2C activity detector controller 506 controls whether the other device on the I2C communication bus receive a serial clock signal and data from the I2C communication bus or a serial clock signal and data from the I2C address regenerator 508. Whether the other device on the I2C communication bus receive a serial clock signal and data from the I2C communication bus or a serial clock signal and data from the I2C address regenerator 508 depends upon whether the other device to which the wakeup request is sent awakens from a sleep mode, as discussed herein. In response to receiving the a_match signal from the I2C address matcher 504, the I2C activity detector controller 506 outputs a gen_en signal to activate the I2C address regenerator 508 for re-generating the predefined address that is provided to the other device to which the wakeup request is sent.

As a further example, the I2C activity detector controller 506 is further coupled to the other device to which the wakeup request is sent, the first multiplexer 512, the second multiplexer 514, and the pull down circuitry 516. In response to the other device to which the wakeup request is sent awakening from the sleep mode, the I2C activity detector controller 506 receives a system_rdy signal from the other device to which the wakeup request was sent, the system_rdy signal indicating that the other device to which the wakeup request was sent has awoken from the sleep mode. In response to receiving the system_rdy signal, the I2C activity detector controller 506 outputs a gen_en signal to the I2C address regenerator 508 for re-generating the predefined address and a serial clock signal for the other device to which the wakeup request is sent. Additionally, in response to the other device to which the wakeup request is sent awakening from the sleep mode, the I2C activity detector controller 506 outputs an scl_sw_over signal to the first multiplexer 512 and an sda_sw_over signal to the second multiplexer 514, the scl_sw_over signal indicating that the first multiplexer 512 is to switch between its two inputs and the sda_sw_over signal indicating that the second multiplexer 514 is to switch between its two inputs. When the other device to which the wakeup request is sent enters the sleep mode, the I2C activity detector controller 506 receives a i2c_mon_enable signal from the other device to which the wakeup request is sent. The I2C activity detector controller 506 responds to the i2c_mon_enable signal by activating the I2C address matcher 504 to monitor addresses on the SDA line of the I2C communication bus, in particular for the predefined address associated with other device to which the wakeup request is sent (e.g., the power delivery controller 202). Additionally, the I2C activity detector controller 506 responds to the system_rdy signal from the other device to which the wakeup request is sent, by deactivating the I2C address matcher 504 to discontinue monitoring addresses on the SDA line of the I2C communication bus after the other device to which the wakeup request was sent has awoken from the sleep mode. The I2C activity detector controller 506 further controls the pull down circuitry 516 according to an operating mode of the other device to which the wakeup request was sent (e.g., the power delivery controller 202), such as discussed below.

By way of example, the I2C address regenerator 508 outputs the predefined address and a serial clock signal, which it re-generates, to respective inputs of the other device connected to the I2C communication bus in response to the monitored address matching the predefined address while the other device to which the wakeup request is sent is in the sleep mode (responsive to the i2c_mon_enable signal). The I2C address regenerator 508 re-generates the predefined address that is matched by the I2C address matcher 504, received on the I2C communication bus. For instance, the predefined address associated with the device to which the wakeup request is sent is stored in the non-volatile memory 518 coupled to an input of the I2C address regenerator 508. The I2C address regenerator 508 receives the gen_en signal from the I2C activity detector controller 506. In response to receiving the gen_en signal, the I2C address regenerator 508 re-generates and outputs a notification including the predefined address and a serial clock signal to the other device to which the wakeup request was sent, which occurs in response to the detecting that the monitored address matches the predefined address associated with the other device to which the wakeup request was sent. The I2C address regenerator 508 outputs the notification including a message data packet, which includes the predefined address, to the first multiplexer 512 and outputs the re-generated serial clock signal to the second multiplexer 514. Subsequent to outputting the notification including the data packet and the serial clock signal to the first multiplexer 512 and the second multiplexer 514, respectively, the I2C address regenerator 508 outputs a gen_done signal to the I2C activity detector controller 506. In response to receiving the gen_done signal, the I2C activity detector controller 506 outputs a pull_down_disable signal to the pull down circuitry 516 to disable (deactivate) the pull down circuitry 516. Additionally, in response to the gen_done signal, the I2C activity detector controller 506 outputs the scl_sw_over signal to the first multiplexer 512 and the sda_sw_over signal to the second multiplexer 514.

As a further example, the pull down circuitry 516 either pulls down the SCL line of the I2C communication bus, that is it holds the SCL line of the I2C communication bus at a low logical level (e.g., electrical ground), or alternatively allows the SCL line of the I2C communication bus to operate unimpeded. Pulling down the SCL line of the I2C communication bus enables the I2C activity detector 502 to utilize the clock stretching feature of the I2C protocol to prevent an additional request from being transmitted to the other devices on the I2C communication bus. The pull down circuitry 516 pulls down the SCL line of the I2C communication bus in response to receiving the pull_down_en signal from the I2C address matcher 504, the pull_down_en signal being generated in response to the monitored address matching the predefined address. Likewise, the pull down circuitry 516 allows the SCL line of the I2C communication bus to operate unimpeded in response to receiving the pull_down_disable signal from the I2C activity detector controller 506. The pull down circuitry 516 thus is activated to pull down or pause the SCL line of the I2C communication bus in response to the I2C activity detector 502 detecting that the monitored address matches the predefined address while the other device to which the wakeup request is sent operates in the sleep mode and until detecting that the other device to which the wakeup request was sent has awoken from the sleep mode.

In an example, the I2C address regenerator 508 is clocked via a serial clock signal scl_clk received via the SCL line of the I2C communication bus, which eliminates a clock signal from having to be generated from within the I2C activity detector 502. In examples disclosed herein, the I2C address regenerator 508 also has the functionality to receive the clock signal from the system clock 310 of FIGS. 3 and 4. The I2C activity detector controller 506 and the I2C address matcher 504 receive a separate sys_clk signal from a system in which the I2C activity detector 502 operates and is clocked by the sys_clk. Since the I2C activity detector controller 506 and the I2C address regenerator 508 are initially deactivated while the I2C address matcher 504 determines if one of addresses received from the I2C communication bus matches the predefined address, the I2C activity detector 502 operates in a very low power state consuming only leakage power. Thereafter, once an address match is detected by the I2C address matcher 504 and the I2C activity detector controller 506 and the I2C address regenerator 508 are activated, the power requirements of the I2C activity detector 504 returns to the very low power state consuming only leakage power.

The first multiplexer 512 is coupled to the SCL line of the I2C communication bus, to the I2C address regenerator 508. The first multiplexer 512 outputs a clock signal or another clock signal dependent upon if the other the device to which the wakeup request is sent is in a sleep mode or if the device to which the wakeup request is sent awakes from the sleep mode. While the device to which the wakeup request is sent is in the sleep mode, the first multiplexer 512 outputs another clock signal, e.g., a serial clock signal received from the I2C address regenerator 508. In response to the I2C activity detector 502 detecting that the device to which the wakeup request is sent awakens from the sleep mode, the first multiplexer 512 passes the clock signal, e.g., the serial clock signal from the SCL line of the I2C communication bus, to the device to which the wakeup request is sent in response to detecting that the device to which the wakeup request is sent has awoken from the sleep mode. The first multiplexer 512 receives the scl_sw_over signal from the I2C activity detector controller 506 that switches the first multiplexer 512 from outputting the serial clock signal received from the I2C address regenerator 508 to outputting (passing) the serial clock signal received from the SCL line of the I2C communication bus to the clock input of the device to which the wakeup request is sent.

In the example of FIG. 5, the second multiplexer 514 is coupled to the SDA line of the I2C communication bus, to the I2C address regenerator 508. The second multiplexer 514 outputs a different notification including a data packet in response to the device to which the wakeup request is sent being in the sleep mode or if the device to which the wakeup request awakes from the sleep mode. While the device to which the wakeup request is sent is in a sleep mode, the second multiplexer 514 outputs the different notification including a data packet received from the I2C address regenerator 508, the data packet including the predefined address. The second multiplexer 514 passes the different notification including the predefined address to the device to which the wakeup request is sent (e.g., the power delivery controller 202) in response to the I2C activity detector 502 detecting that the device to which the wakeup request was sent has awoken from the sleep mode. In response to the I2C activity detector 502 detecting that the device to which the wakeup request was sent awakens from the sleep mode, the second multiplexer 514 outputs the different notification including the data packet, e.g., a request, received from the SDA line of the I2C communication bus. The second multiplexer 514 receives the sda_sw_over signal from the I2C activity detector controller 506 that switches the second multiplexer 514 from outputting the different notification including the data packet received from the I2C address regenerator 508 to outputting the different notification including the data packet received from the SDA line of the I2C communication bus.

Figure 6:
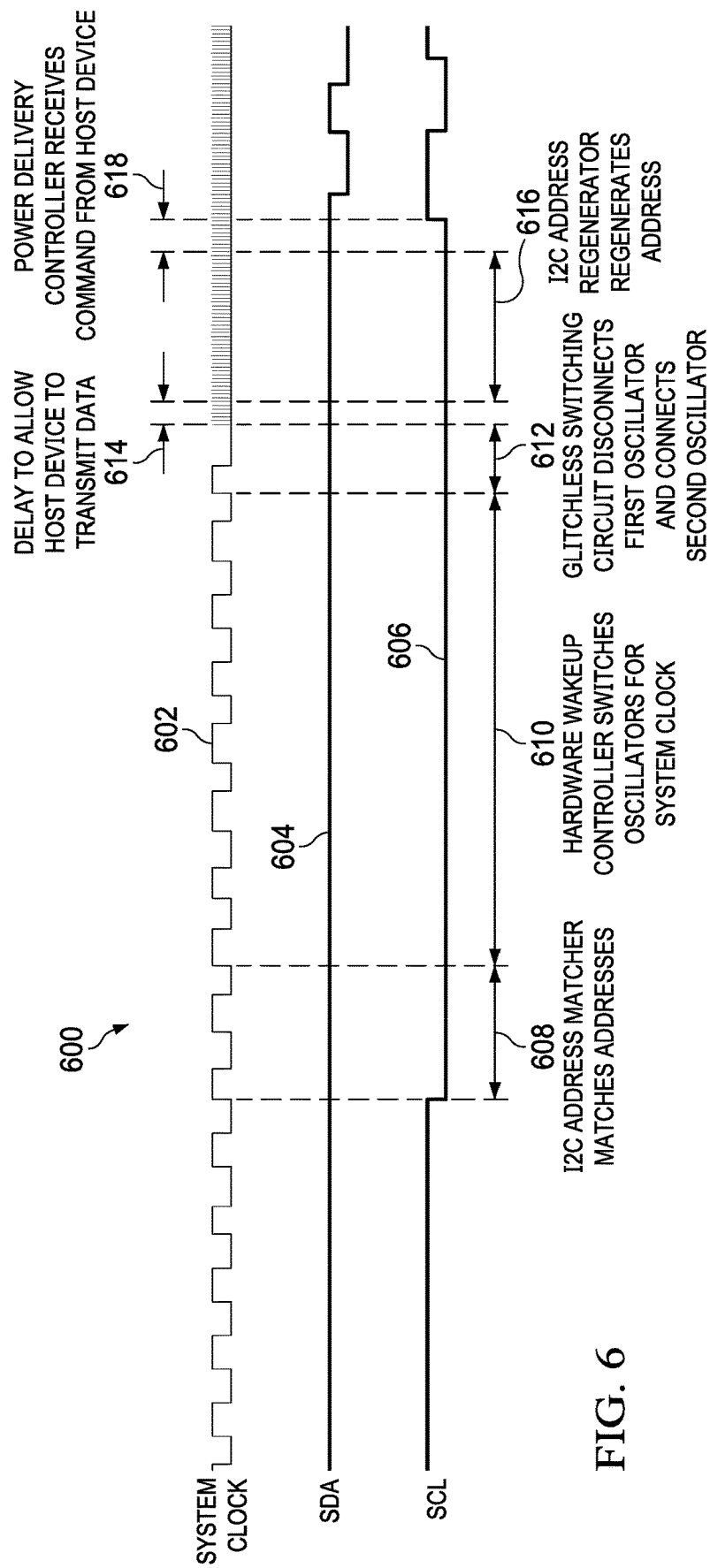
FIG. 6 is an example timing diagram showing a wakeup time of the wakeup circuit of FIGS. 3, 4, and 5.

FIG. 6 is an example timing diagram 600 showing wakeup time when waking up the power delivery controller 202 with the wakeup circuit 218 and I2C activity detector 402 and I2C activity detector 502 of FIGS. 3, 4, and 5. The timing diagram 600 includes a signal plot 602, a signal plot 604, a signal plot 606, a first time span 608, a second time span 610, a third time span 612, a fourth time span 614, a fifth time span 616, and a sixth time span 618.

The example timing diagram 600 illustrates the amount of time that passes between a requested action (e.g., a wakeup request) from a first device (e.g., the host device 204) to a second device (e.g., the power delivery controller 202). In the example, the signal plot 602 illustrates the clock signal for system clock 310 of FIGS. 3, 4, and 5. The signal plot 602 shows the system clock 310 at the first frequency (e.g., 100 kHz) of the first oscillator 312 and the second frequency (e.g., 12 MHz) of the second oscillator 314.

The example timing diagram 600 includes the signal plot 604. The signal plot 604 illustrate the SDA line of the I2C communication bus during the time between a requested action and the execution of the requested action. During the time that the system clock 310 is switching from the first oscillator 312 to the second oscillator 314, the SDA line remains high. The example timing diagram 600 includes the signal plot 606. The signal plot 606 illustrates the SCL line of the I2C communication bus during the time between a requested action and the execution of the requested action. During the time that the hardware wakeup controller 304 is switching the system clock 310 from the first oscillator 312 to the second oscillator 314, the SCL line remains low.

The example timing diagram 600 includes the first time span 608. The example first time span 608 is the time it takes for the I2C address matcher 404 and/or the I2C address matcher 504 to determine that the address received on the I2C communication bus matches the address of the device that is being woken up (e.g., the power delivery controller 202). In the example, the first time span 608 takes two cycles at a frequency of 100 kHz, or 20 µs.

The example timing diagram 600 includes the second time span 610. The example second time span 610 is the time it takes for the hardware wakeup controller 304 to, via the glitchless switching circuit 308, switch the system clock 310 from the first oscillator 312 to the second oscillator 314. In the example, the second time span 610 takes seven cycles at a frequency of 100 kHz, or 70 µs.

The example timing diagram 600 includes the third time span 612. The example third time span 612 is the time it takes for the hardware wakeup controller 304 to disconnect the first oscillator 312 from the system clock 310 and connect the second oscillator 314 to the system clock 310. In the example, the third time span 612 takes one cycle at a frequency of 100 kHz, or 10 µs.

The example timing diagram 600 includes the fourth time span 614. The example fourth time span 614 is the time it takes for the hardware wakeup controller 304 to determine that the second oscillator 314 has stabilized before the I2C activity detector controller 406 and/or the I2C activity detector controller 506 regenerates the address received on the I2C communication bus and/or the address received and/or obtained from the communication bus controller 306. In the example, the fourth time span 614 takes sixteen cycles at a frequency of 12 MHz, or 1.33 µs.

The example timing diagram 600 includes the fifth time span 616. The example fifth time span 616 is the time it takes for the I2C address regenerator 408 and/or the I2C address regenerator 508 to regenerate the address received on the I2C communication bus and/or the address received and/or obtained from the communication bus controller 306. In the example, the fifth time span 616 takes 96 cycles at 12 MHz, 3 cycles at 400 kHz, or 8 µs. In other examples, the frequency of the address received on the I2C communication bus and/or the address received and/or obtained from the communication bus controller 306 can vary based on a tuned frequency for a suitable application.

The example timing diagram 600 includes the sixth time span 618. The example sixth time span 618 is the time it takes for a delay to expire before releasing the SCL line to a logic high value. Additionally, the sixth time span 618 is the time during which the host device 204 writes data to the SDA line so that the communication bus controller 306 can obtain the data after wakeup. In the example, the sixth time span 618 takes 60 cycles at 12 MHz, or 5 µs.

In the timing diagram 600, the sum of the first time span 608, the second time span 610, the third time span 612, the fourth time span 614, the fifth time span 616, and the sixth time span 618 is 114.33 µs or approximately 115 µs. Thus, in the example, when implementing the hardware wakeup controller 304 to, via the glitchless switching circuit 308, switch the system clock 310 from the first oscillator 312 to the second oscillator 314, it takes approximately 115 µs to transition the power delivery controller 202 from the deep sleep mode of operation to the active mode of operation and regenerate an address via the I2C address regenerator 408 and/or the I2C address regenerator 508.

Figure 7:
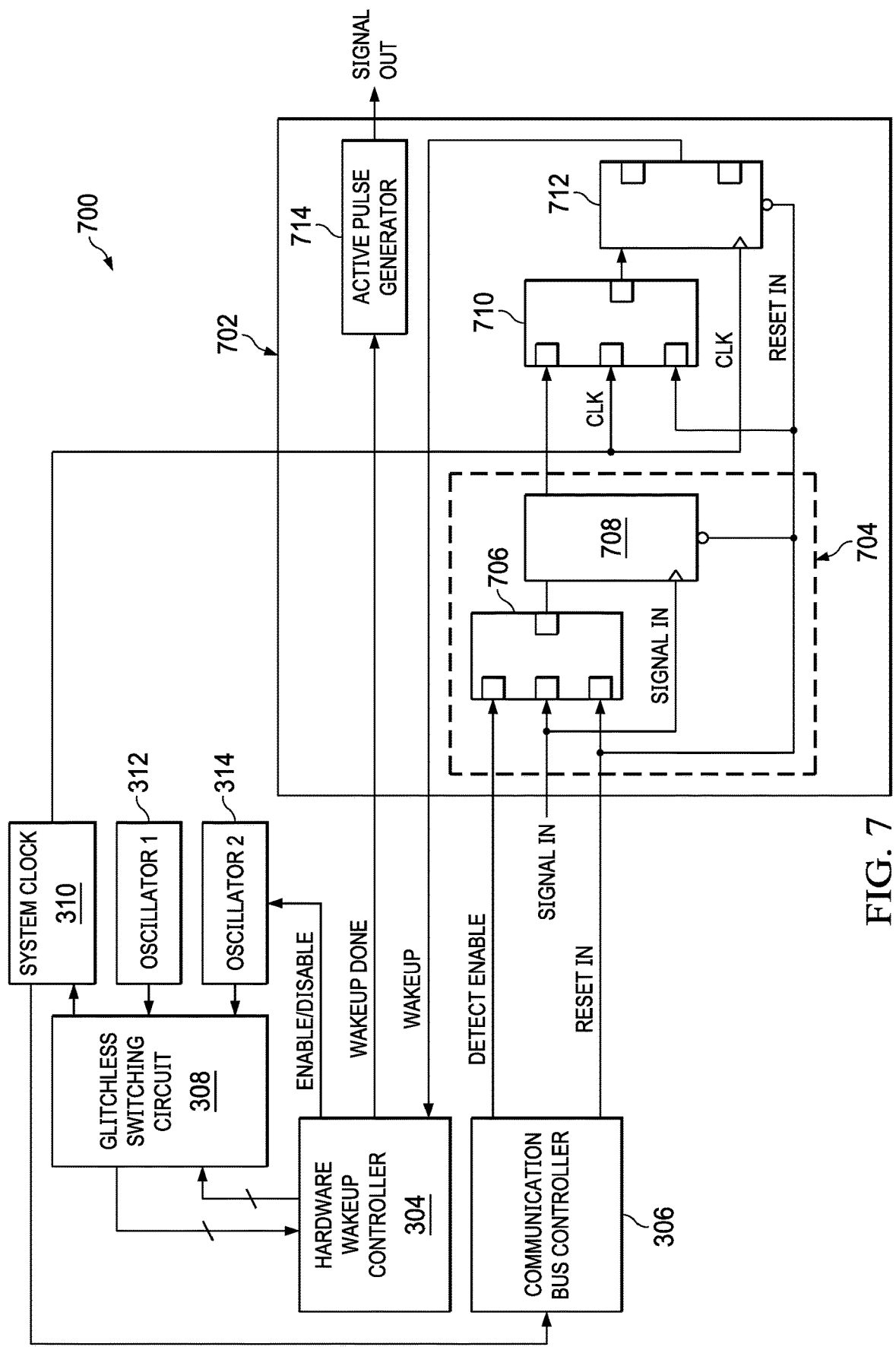
FIG. 7 is an alternate example wakeup circuit including a power delivery activity detector.

FIG. 7 is an alternate example wakeup circuit 700 including a power delivery activity detector 702. The wakeup circuit 700 of FIG. 7 includes the same elements of the wakeup circuit 218 of FIG. 3. In the example of FIG. 7, the wakeup circuit 700 includes the power delivery activity detector 702, the hardware wakeup controller 304, the communication bus controller 306, the glitchless switching circuit 308, the system clock 310, the first oscillator 312, and the second oscillator 314. The example hardware wakeup controller 304, the example communication bus controller 306, the example glitchless switching circuit 308, the example system clock 310, the example first oscillator 312, and example the second oscillator 314 operate as discussed in connection with FIG. 3. Henceforth, the example hardware wakeup controller 304, the example communication bus controller 306, the example glitchless switching circuit 308, the example system clock 310, the example first oscillator 312, and example the second oscillator 314 will not be discussed further except for interactions with the power delivery activity detector 702.

The example power delivery activity detector 702 includes the edge detector 704, the synchronizer 710, the active pulse generator 714, and the active pulse generator 714. The edge detector 704 includes the synchronizer 706 and the flip-flop 708. In the example, the power delivery activity detector 702 is coupled to the communication bus controller 306, the hardware wakeup controller 304, the system clock 310, and the communication bus 208. In the example, the communication bus is the R/T communication bus 210.

In the example, the edge detector 704 includes the synchronizer 706 and the flip-flop 708. The example synchronizer 706 is coupled to the example signal in input. The example signal in input is the receiver line of the control unit 216. In the example, the signal in input receives the preamble of a PD communication. The edge detector 704 is a logic circuit that stores three bits to detect when a PD communication is being transmitted to the receiver line of the control unit 216. In the example, the synchronizer 706 includes two flip-flops connected in series. The synchronizer 706 operates at the frequency of the preamble of the PD communication. The synchronizer 706 obtains a detect enable input and obtains the reset in input from the communication bus controller 306. The synchronizer 706 also receives the reset in input. The reset input controls whether the edge detector 704 resets and erases the stored data within the edge detector 704. The synchronizer 706 outputs an activity_synch_2_ff signal. The detect enable input is a logic high value when the power delivery activity detector 702 is to detect activity and/or requested actions on the R/T communication bus. When the power delivery activity detector 702 detects a requested action on the R/T communication bus, hardware wakeup controller 304 switches the system clock 310 from the first oscillator 312 to the second oscillator 314. Additionally, the communication bus controller 306 sets the detect enable input to a logic low value. The flip-flop 708 receives the activity_sync_2_ff signal from the synchronizer 706 and the reset in input from the communication bus controller 306. The flip-flop 708 outputs an activity_sync_3_ff signal.

In the example, the edge detector 704 stores a bit at every rising edge of a PD communication received and/or obtained from R/T communication bus. In the example, the signal in input is the preamble of the PD communication. A first rising edge of the preamble triggers the synchronizer 706 to store a first logic high value received and/or obtained from the detect enable input. A second rising edge of the preamble triggers the synchronizer 706 to store a second logic high value received and/or obtained from the detect enable input. The synchronizer 706 stores two logic high values. The flip-flop 708 stores a third logic high value at a third rising edge of the preamble. In this way, the edge detector 704 stores three logic values corresponding to the alternating preamble that is transmitted before PD communications.

In the example, the power delivery activity detector 702 includes the synchronizer 710. The synchronizer 710 includes two flip-flops connected in series. The synchronizer 710 receives the activity_sync_3_ff signal, the system clock 310, and the resent in input as inputs. The synchronizer 710 operates at the speed of the system clock 310. The synchronizer 710 synchronizes the logic values stored in the edge detector 704 with the system clock 310. The synchronizer 710 detects a rising edge of the system clock 310 and in response to detecting the rising edge, the synchronizer 710 sends the activity_sync_3_ff signal through to the logic circuit 712. The synchronizer 710 outputs the activity_sync_3_ff signal to the logic circuit 712 as the pulse_sync_2_ff signal.

The logic circuit 712 operates at the speed of the system clock 310. The logic circuit 712 receives the pulse_sync_2_ff signal as an input. In response to the pulse_sync_2_ff signal including a logic high value, the logic circuit 712 generates a notification and sends the notification to the hardware wakeup controller 304. In response to detecting the notification, the hardware wakeup controller 304 switches the system clock 310 from the first oscillator 312 to the second oscillator 314.

When the hardware wakeup controller 304 switches the system clock 310 from the first oscillator 312 to the second oscillator 314 the hardware wakeup controller 304 sends a second notification to the active pulse generator 714. The active pulse generator 714 generates a third notification indicating the control unit 216 is awake and ready to receive additional requested actions.

In the example, the power delivery activity detector 702 detects requested actions on the R/T communication bus. The requested actions may be requested from other devices on the R/T communication bus (e.g., the USB-C capable device 206). In the example, the edge detector 704 detects three rising edges on the signal in input. In response to detecting a first rising on the signal in input, the edge detector 704, via the synchronizer 706, stores a first logic high value. In response to detecting a second rising edge on the signal in input, the edge detector 704, via the synchronizer 706, stores a second logic high value. In response to detecting a third rising edge on the signal in input, the edge detector 704, via the flip-flop 708, stores a third logic high value. The edge detector 704 sends the activity_sync_3_ff signal to the synchronizer 710 indicating whether the edge detector 704 detected three rising edges on the signal in input. The synchronizer 710 synchronizes the activity_sync_3_ff signal with the system clock 310. In response to receiving a logic high value from the activity_sync_3_ff, the synchronizer 710, at the rising edge of the system clock 310, outputs a logic high value corresponding to the edge detector 704 detecting three rising edge on the signal in input. In response to not receiving a logic high value from the activity_sync_3_ff, the synchronizer 710, at the rising edge of the system clock 310, outputs a logic low value corresponding to the edge detector 704 not detecting three rising edge on the signal in input. In the example, in response to receiving a logic high value, the logic circuit 712 generates a notification and sends the notification to the hardware wakeup controller 304. The hardware wakeup controller 304 switches the system clock 310 from the first oscillator 312 to the second oscillator 314. The hardware wakeup controller 304 sends a signal to the activity pulse generator 714 indicating that the hardware wakeup controller 304 switched the system clock 310 from the first oscillator 312 to the second oscillator 314. In response to the signal from the hardware wakeup controller 304, the active pulse generator 714 generates a second notification indicating the control unit 216 is awake and ready to receive additional requested actions.

Figure 8:
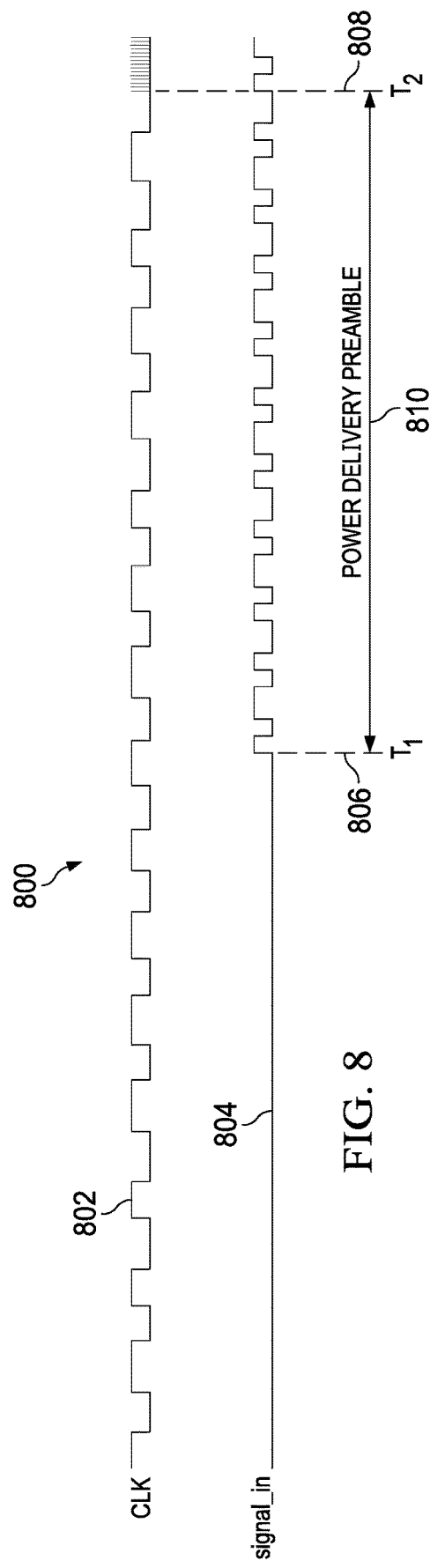
FIG. 8 is an example timing diagram showing a wakeup time of wakeup circuit of FIGS. 3 and 7.

FIG. 8 is an example timing diagram showing a wakeup time of wakeup circuit 218 of FIGS. 3 and 7. The example timing diagram 800 includes a signal plot 802, a signal plot 804, a time 806 ($T_1$), a time 808 ($T_2$), and a power delivery preamble 810. In the example, the signal plot 802 illustrates the system clock 310 of FIGS. 3 and 7. The system clock 310 transitions from the first frequency (e.g., 100 kHz) to the second frequency (e.g., 12 MHz). The example timing diagram 800 includes the signal plot 804. The signal plot 804 illustrates the signal in input. In the example, the signal in input includes the PD communication preamble.

The example timing diagram 800 includes the time 806 ($T_1$). The time 806 ($T_1$) is the time at which a device on the R/T communication bus starts transmitting a PD communication. The time 806 ($T_1$) is at 2.32356095 milliseconds (ms) from the beginning of the signal plot 804. The example timing diagram 800 includes the time 808 ($T_2$). The time 808 ($T_2$) is the time at which a device on the R/T communication bus starts transmitting a PD communication. The time 806 ($T_2$) is at 2.38 ms from the beginning of the signal plot 804. The example timing diagram 800 also includes the power delivery preamble 810. The power delivery preamble is an alternating signal sent over the R/T communication bus to synchronize two devices communicating over the R/T communication bus.

In the example timing diagram 800, the difference between the time 806 and the time 808 is 62.439 µs or approximately 63 µs. Thus, in the example, when implementing the hardware wakeup controller 304 to, via the glitchless switching circuit 308, switch the system clock 310 from the first oscillator 312 to the second oscillator 314, it takes approximately 63 µs to transition the power delivery controller 202 from the deep sleep mode of operation to the active mode of operation via the power delivery activity detector 702.

Figure 9:
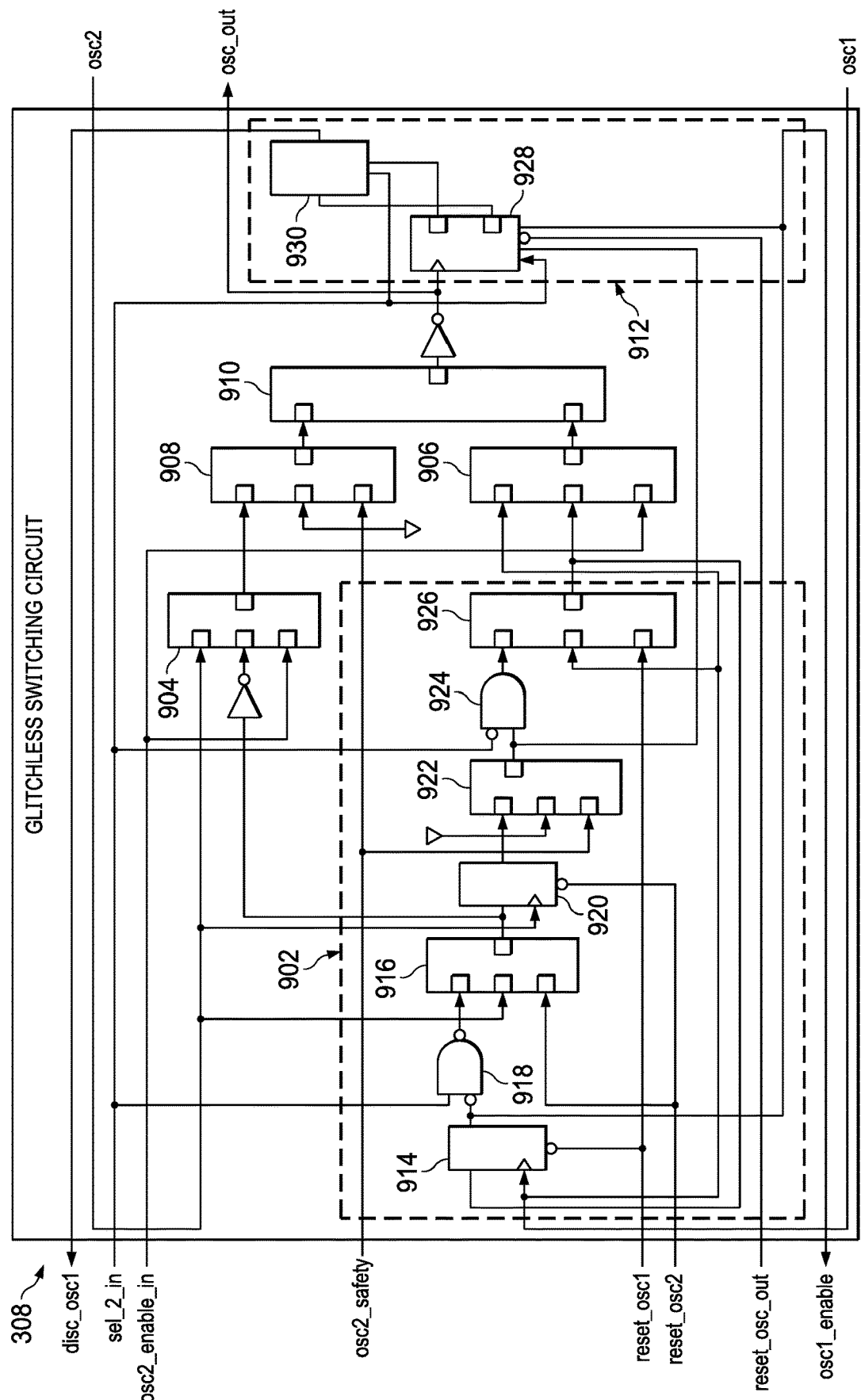
FIG. 9 is an example schematic illustration of the glitchless switching circuit of FIGS. 3, 4, 5, and 7.

FIG. 9 is an example schematic illustration of the glitchless switching circuit 308 of FIGS. 3, 4, and 6. The example glitchless switching circuit 308 includes an oscillator synchronizer 902, a second oscillator logic circuit 904, a first oscillator logic circuit 906, a first multiplexer 908, a logic circuit 910, and a logical selector 912. The oscillator synchronizer 902 includes a first flip-flop 914, a first synchronizer 916, a first AND logic gate 918, a second multiplexer 922, a second AND logic gate 924, and a second synchronizer 926. The logical selector 912 includes a logic circuit 928 and a logic circuit 930.

In the example, the oscillator synchronizer 902 is a combinational logic circuit that synchronizes the first oscillator 312 (osc1) with the second oscillator 314 (osc2). The example first flip-flop 914, the example first synchronizer 916, and the example second flip-flop 920 store logic values (e.g., a binary '1' or a binary '0') and partially synchronize the first oscillator 312 and the second oscillator 314. The first AND logic gate 918 determines when to store the logic value generated by the first flip-flop 914 based on the sel_2_in provided by the hardware wakeup controller 304. The logic value generated by the first flip-flop 914 corresponds to the second oscillator 314 being off. The first flip-flop 914 additionally sends a disable signal to the first oscillator 312. The example second multiplexer 922 controls whether the first oscillator 312 is synchronized with the second oscillator 314 based on the osc2_safety input provided by the hardware wakeup controller 304. The osc2_safety input corresponds to whether the second oscillator 314 has stabilized as on. If the second oscillator 314 has stabilized as on, second multiplexer 922 outputs a logic value based on the partial synchronization of the first oscillator 312 and the second oscillator 314. If the second oscillator 314 has not stabilized as on, the second multiplexer 922 outputs a logic high value. The second AND logic gate 924 controls whether the second synchronizer 926 completes the synchronization of the first oscillator 312 and the second oscillator 314. If the second AND logic gate 924 receives the sel_2_in from the hardware wakeup controller 304, the second AND logic gate 924 passes the partially synchronized signal based on the first oscillator 312 signal and the second oscillator 314 signal to the second synchronizer 926. If not the second synchronizer 926 receives a logic low value. The second synchronizer 926 fully synchronizes the first oscillator 312 and the second oscillator 314.

In the example, the first flip-flop 914 and the second flip-flop 920 are reset by the reset_osc1 input. This sets the logic values stored by the flip-flops to logic low values. In the example, the first synchronizer 916 and the second synchronizer 926 are reset by the reset_osc2_input. This sets the logic values stored by the synchronizers to logic low values.

The second oscillator logic circuit 904 controls whether the second oscillator 314 transmits a first signal at a first frequency (e.g. 12 MHz) to the other elements of the glitchless switching circuit 308. The second oscillator logic circuit 904 determines whether to transmit the first signal based on the osc2_enable_in input provided by the hardware wakeup controller 304. If the osc2_enable_in input is a logic high value, the second oscillator logic circuit 904 transmits the first signal. Otherwise the second oscillator logic circuit 904 does not transmit the first signal.

The first oscillator logic circuit 906 controls whether the first oscillator 312 transmits a second signal at a second frequency (e.g. 100 kHz) to the other elements of the glitchless switching circuit 308. The first oscillator logic circuit 906 determines whether to transmit the second signal based on the osc2_enable_in input provided by the hardware wakeup controller 304. If the osc2_enable_in input is a logic low value, the first oscillator logic circuit 906 transmits the second signal. Otherwise the first oscillator logic circuit 906 does not transmit the second signal.

The first multiplexer 908 determines whether to send the first signal from the second oscillator logic circuit 904 to the logic circuit 910 based on the osc2_safety input provided by the hardware wakeup controller 304. If the osc2_safety input is a logic high value, the first multiplexer 908 sends the first signal to the logic circuit 910. Otherwise, the first multiplexer 908 sends a logic low value to the logic circuit 910. The logic circuit 910 is a logic circuit that transmits the first signal from the second oscillator 314 to the logical selector 912 and the hardware wakeup controller 304. The logic circuit 910 also outputs the signal from second oscillator 314 over osc_out output. In the example the logic circuit 910 is a NOR gate.

The example first synchronizer 916, the example second flip-flop 920, and the second oscillator logic circuit 904 receive the second signal from the second oscillator 314 at the osc2 input.

The first flip-flop 914, the second synchronizer 926, and the first oscillator logic circuit 906 receive the first signal from the first oscillator 312 at the osc1 input.

The logical selector 912 determines whether the second oscillator 314 has stabilized as on. In response to the second oscillator 314 stabilizing as on, the logical selector 912 notifies the hardware wakeup controller 304 that the system clock 310 is ready to be switched from the first oscillator 312 to the second oscillator 314.

The logical selector 912 includes the logic circuit 928 and the logic circuit 930. The logic circuit 928 monitors the other combinational logic circuits in the glitchless switching circuit 308 and determines whether to disconnect the system clock 310 from the first oscillator 312 and connect the system clock 310 to the second oscillator 314. The logic circuit 928 determines whether the sel_2_in is a logic high and whether the second oscillator 314 is ready to be connected to the system clock 310. If both values are logic high values, the logic circuit 928 notifies the logic circuit 930 that the second oscillator 314 is ready to be connected to the system clock 310. Otherwise, the second oscillator 314 is not ready to be connected to the system clock 310. Because the hardware wakeup controller 304 is hardware based and therefore does not rely on the speed of the system clock 310, the logic circuit 928 sends a logic high value to the osc1_enable output to notify the hardware wakeup controller 304 that the device (e.g., the power delivery controller 202) is in sleep mode. The logic circuit 928 resets the osc_out output of the logic circuit 910 when the logic circuit 928 receives a logic high value on the reset_osc_out input.

The logic circuit 930 performs a second check to determine whether the second oscillator 314 is ready to be connected to the system clock 310. The logic circuit 930 compares the notification from the logic circuit 930 to the sel_2_in input. If both values are logic high values, the logic circuit 930 sends a notification to the hardware wakeup controller that the second oscillator 314 is ready to be connected to the system clock 310. Otherwise, the logic circuit 930 does not send a notification. The logic circuit 930 sends the notification over the disc_osc1 output.

While an example manner of implementing the wakeup circuit 218 of FIG. 3 is illustrated in FIGS. 4 and 7, one or more of the elements, processes and/or devices illustrated in FIGS. 4 and 7 may be combined, divided, re-arranged, omitted, eliminated and/or implemented in any other way. Further, the example activity detector 302, the example hardware wakeup controller 304, the example communication bus controller 306, the example glitchless switching circuit 308, the example system clock 310, the example first oscillator 312, the example second oscillator 314 and/or, more generally, the example wakeup circuit 218 of FIG. 3 may be implemented by hardware, software, firmware and/ or any combination of hardware, software and/or firmware. Thus, for example, any of the example activity detector 302, the example hardware wakeup controller 304, the example communication bus controller 306, the example glitchless switching circuit 308, the example system clock 310, the example first oscillator 312, the example second oscillator 314 and/or, more generally, the example wakeup circuit 218 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example activity detector 302, the example hardware wakeup controller 304, the example communication bus controller 306, the example glitchless switching circuit 308, the example system clock 310, the example first oscillator 312, the example second oscillator 314 is/are hereby expressly defined to include a non-transitory computer readable storage device or storage disk such as a memory, a digital versatile disk (DVD), a compact disk (CD), a Blu-ray disk, etc. including the software and/or firmware. Further still, the example wakeup circuit 218 of FIG. 3 may include one or more elements, processes and/or devices in addition to, or instead of, those illustrated in FIGS. 4 and 7 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the wakeup circuit 218 of FIG. 3 is shown in FIGS. 4 and 7. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 10, many other methods of implementing the example wakeup circuit 218 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 10 and 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/ or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

Figure 10:
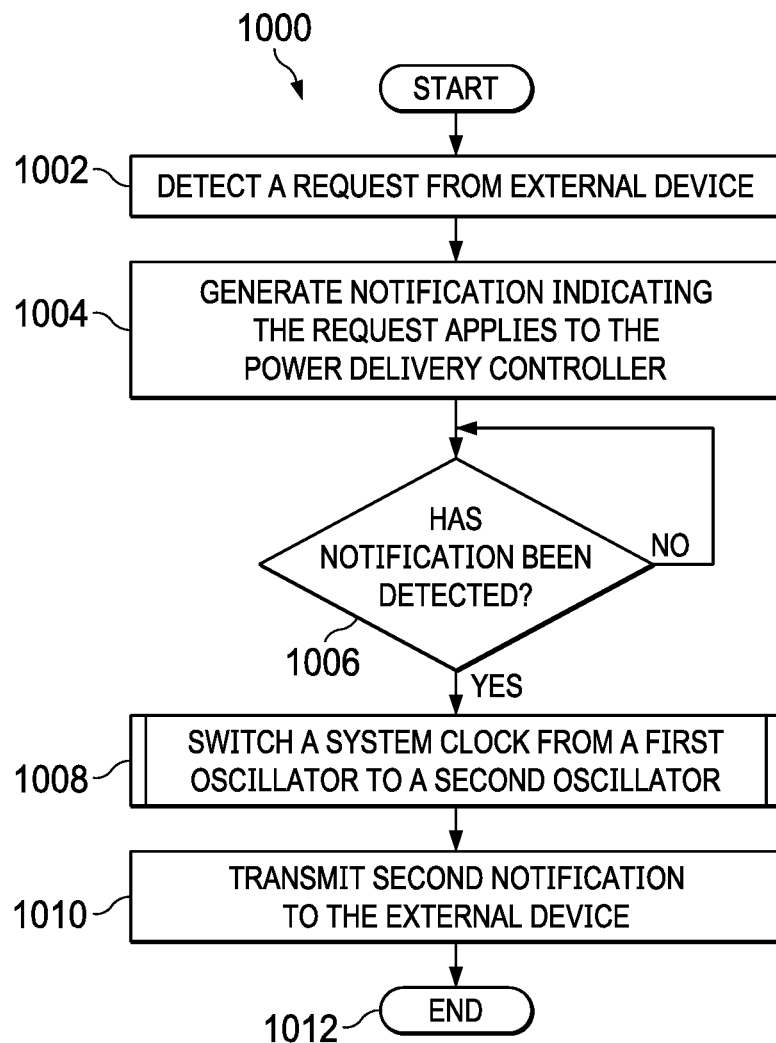
FIG. 10 is a flowchart representative of machine readable instructions that may be executed to implement the wakeup circuit of FIGS. 3, 4, 5, and 7.

FIG. 10 is a flowchart representative of machine readable instructions that may be executed to implement the wakeup circuit of FIGS. 3, 4, 5, and 7 to transition the power delivery controller 202 from a first operational state to a second operational state. The program 1000 of FIG. 10 starts at block 1002 where the activity detector 302 detects a request from an external device for a function (e.g., request a function). The external device is for example, the host device 204. In the example, the request from the host device 204 is a request for the power delivery controller 202 to transition from a deep sleep mode of operation to an active mode of operation so that the power delivery controller 202 can request PD capabilities from a USB-C® capable device connected to the host device 204. In other examples the external device is the USB-C® capable device 206. In the example, the request from the USB-C® capable device 206 is a request for the power delivery controller 202 to negotiate a contract between the host device 204 and the USB-C® capable device 206.

Next in the program 1000, in response to detecting the request from an external device, the activity detector 302, at block 1004, generates a notification that indicates the request applies to the power delivery controller 202. In some examples, the activity detector 302 generates a notification by matching the address obtained by the activity detector 302 from the I2C communication bus with an address obtained from communication bus controller 306. In other examples, the activity detector 302 generates a notification by matching the activity detector 302 matches the address obtained from the I2C communication bus with a predefined address stored in the activity detector 302. In further examples, the activity detector 302 generates a notification by detecting that three rising edges on a signal connected to the activity detector 302 at the R/T communication bus input.

Next in the program 1000, the hardware wakeup controller 304, at block 1006, monitors the activity detector 302 for the notification. If the hardware wakeup controller 304 does not detect the notification (block 1006: NO), the hardware wakeup controller 304 continues to monitor the activity detector 302. If the hardware wakeup controller 304 detects the notification (block 1006: YES), the hardware wakeup controller, in response to detecting the notification, switches the system clock 310 from a first oscillator 312 to a second oscillator 314 at block 1008. At block 1008, the hardware wakeup controller 304 utilizes the glitchless switching circuit 308 to switch the system clock 310 from the first oscillator 312 to the second oscillator 314. Switching the system clock 310 from the first oscillator 312 to the second oscillator 314 corresponds to transitioning the power delivery controller 202 from the deep sleep mode of operation to the active mode of operation. The hardware wakeup controller 304 generates a signal and sends the signal to the activity detector 302. At block 1010, the activity detector 302 transmits a second notification to the external device. In this manner, after switching the system clock 310 from the first oscillator 312 to the second oscillator 314, the new speed of the system clock 310 (e.g., the speed of the second oscillator 314) allows the power delivery controller 202 to carry out the requested function. The second notification indicates the power delivery controller 202 has transitioned from the deep sleep mode of operation to the active mode of operation (e.g., completed a function). In some examples, the external device is the host device 204. In the example, the second notification indicates the power delivery controller 202 has transitioned from the deep sleep mode of operation to the active mode of operation and is ready to receive further I2C communications. In other examples, the external device is a USB-C® capable device. In the example, the second notification indicates a response to a contract negotiation request. Next, the program 1000 ends at block 1012.

Figure 11:
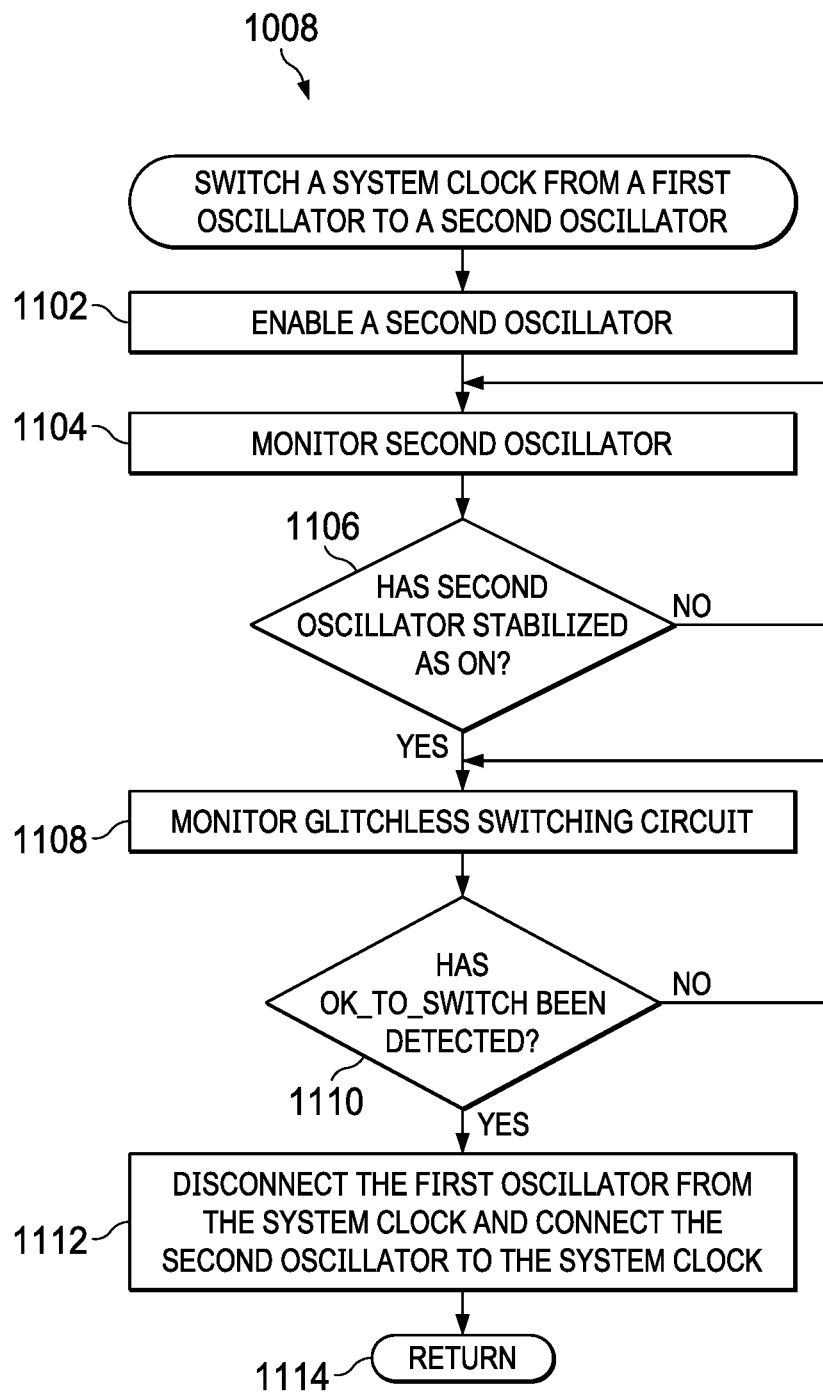
FIG. 11 is a flowchart representative of machine readable instructions that may be executed to implement the wakeup circuit of FIGS. 3, 4, 5, and 7 to switch a system clock from a first oscillator to a second oscillator.

FIG. 11 is a flowchart representative of machine readable instructions that may be executed to implement the wakeup circuit of FIGS. 3, 4, 5, and 7 to switch a system clock 310 from a first oscillator 312 to a second oscillator 314 at block 1008 of the program 1000 of FIG. 10. The sub-program of block 1008 begins at block 1102 where the hardware wakeup controller 304 enables the second oscillator 314. In the example, the hardware wakeup controller 304 enables the second oscillator 314 by sending a logic value (e.g., a logic high value, a binary '1') to the second oscillator 314. Next, the hardware wakeup controller 304 monitors the second oscillator 314, at the block 1104, by utilizing the glitchless switching circuit 308. At block 1106, the hardware wakeup controller 304 monitors the second oscillator 314 and determines whether the second oscillator 314 has stabilized as on. If the glitchless switching circuit 308 determines that the second oscillator 314 has not stabilized as on (block 1106: NO), the hardware wakeup controller 304 continues to monitor the second oscillator 314 with the glitchless switching circuit 308 at block 1104. If the glitchless switching circuit 308 determines that the second oscillator 314 has stabilized as on (block 1106: YES), the hardware wakeup controller 304, at block 1108, monitors the glitchless switching circuit 308 for a notification that it is safe to switch the system clock 310 from the first oscillator 312 to the second oscillator 314. At block 1110, the hardware wakeup controller 304 determines whether it is safe to switch the system clock 310 from first oscillator 312 to the second oscillator 314. If the hardware wakeup controller 304 detects the notification from the glitchless switching circuit 308 (block 1110: YES), the hardware wakeup controller 304 disconnects the first oscillator 312 from the system clock 310 and connects the second oscillator 314 to the system clock 310 at block 1112. If the hardware wakeup controller 304 does not detect the notification from the glitchless switching circuit 308 (block 1110: NO), the hardware wakeup controller 304 monitors the glitchless switching circuit 308 for the notification at block 1108. The hardware wakeup controller 304 disconnects the first oscillator 312 from the system clock 310 and connects the second oscillator 314 to the system clock 310 by utilizing the glitchless switching circuit 308. In the example, when that the glitchless switching circuit 308 determines that the second oscillator 314 has stabilized as on (block 1106: YES), the hardware wakeup controller 304, via the glitchless switching circuit 308, monitors the disc_osc1 output (block 1108). When the first oscillator 312 synchronizes with the second oscillator 314, the glitchless switching circuit 308 outputs a logic value (e.g., a logic high value, a binary '1', etc.) to the disc osc1 output. The logic value indicates to the hardware wakeup controller 304 that the system clock 310 is ready to be disconnected from the first oscillator 312 and connected the second oscillator 314 (block 1110: YES). In the example, the hardware wakeup controller 304 disconnects the first oscillator 312 from the system clock 310 and connects the second oscillator 314 to the system clock 310 by sending a logic value (e.g., a logic high value, a binary '1', etc.) to the osc2_enable_in input of the glitchless switching circuit 308 to enable the output of the signal generated by the second oscillator 314 to the system clock 310. At block 1114, the sub-program 1008 returns to the program 1000 at block 1010.

Figure 12:
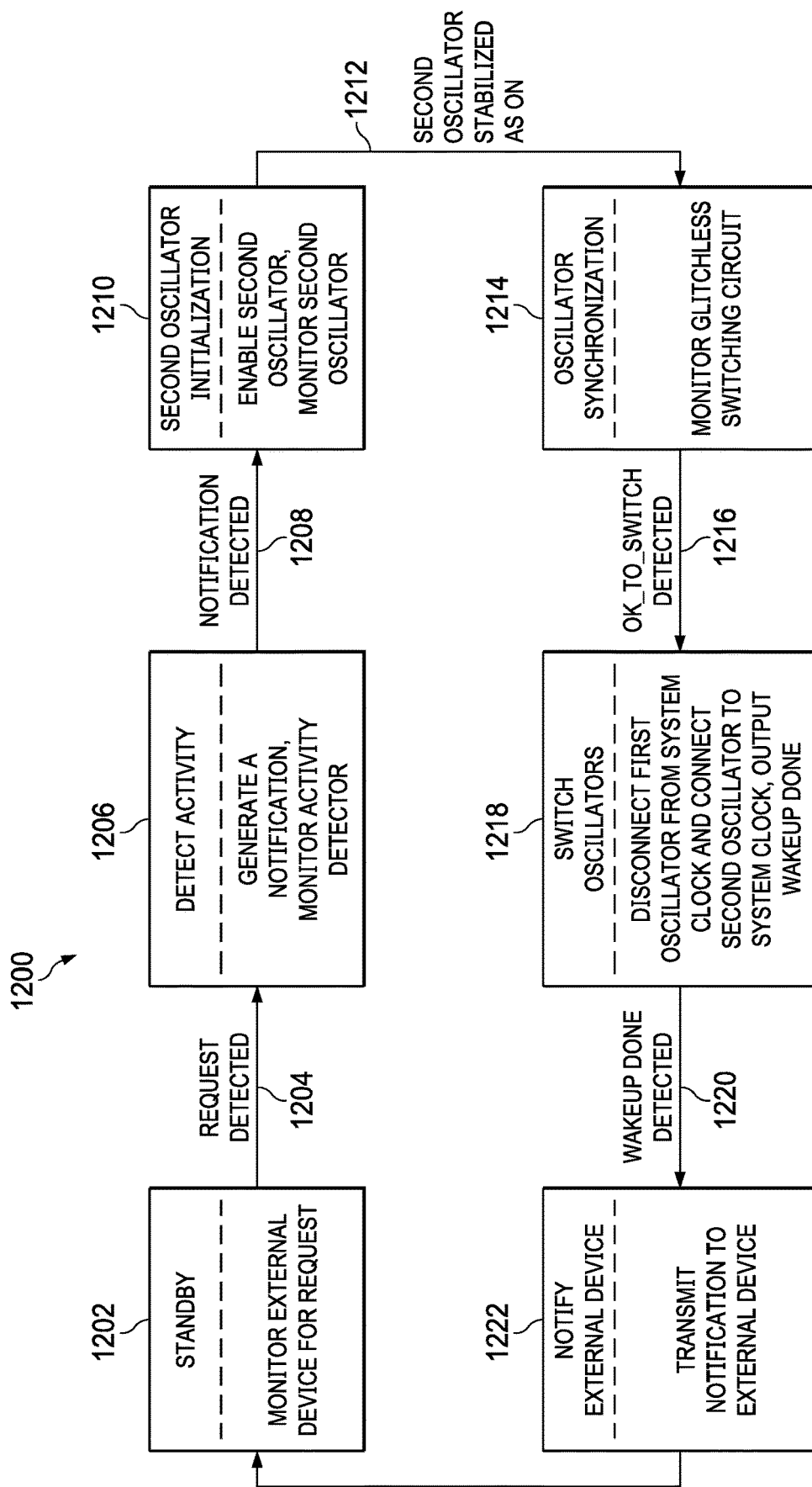
FIG. 12 is a state diagram representative of example operating states in which the example wakeup circuit of FIGS. 3, 4, 5, and 7 may operate.

FIG. 12 is a state diagram 1200 representative of example operating states in which the wakeup circuit 218 of FIGS. 3, 4, 5, and 7 may operate. When in an example first state 1202, the wakeup circuit 218 is in an example standby mode. The example first state 1202 includes an example first operating condition 1204. The first operating condition 1204 determines whether the example wakeup circuit 218 leaves the example first state 1202. In the example first state 1202 the example activity detector 302 monitors an external device to detect a request from the external device for a function. Once a request is detected, the first operating condition 1204 is satisfied.

In the illustrated example of FIG. 12, in response to detecting the request from an external device, the example wakeup circuit 218 enters an example second state 1206 with an example second operating condition 1208. In the example second state 1206, the activity detector 302 generates a notification that indicates the request applies to the power delivery controller 202. Additionally, the example hardware wakeup controller 304 monitors the activity detector 302 for a notification. When a notification is detected, the example second operating condition 1208 is satisfied.

In the illustrated example of FIG. 12, in response to detecting a notification, the example wakeup circuit 218 enters an example third state 1210 with an example third operating condition 1212. In the example third state 1210, the example hardware wakeup controller 304 enables the second oscillator 314 and the example hardware wakeup controller 304 monitors the second oscillator 314 by utilizing the glitchless switching circuit 308. When the example hardware wakeup controller 304 determines, via the glitchless switching circuit 308, that the second oscillator 314 has stabilizes as on, the example third operating condition 1212 is satisfied.

In the illustrated example of FIG. 12, in response to determining that the second oscillator 314 has stabilized as on, the example wakeup circuit 218 enters an example fourth state 1214 with an example fourth operating condition 1216. In the example fourth state 1214, the hardware wakeup controller 304 monitors the glitchless switching circuit 308 for a notification that it is safe to switch the system clock 310 from the first oscillator 312 to the second oscillator 314. Additionally, in the example fourth state 1214, the hardware wakeup controller 304 determines whether it is safe to switch the system clock 310 from first oscillator 312 to the second oscillator 314. When the example hardware wakeup controller 304 detects the notification from the glitchless switching circuit 308, the fourth operating condition 1216 has been satisfied.

In the illustrated example of FIG. 12, in response to detecting the notification from the glitchless switching circuit 308, the example wakeup circuit 218 enters an example fifth state 1218 with an example fifth operating condition 1220. In the example fifth state 1218, the example hardware wakeup controller 304 disconnects the first oscillator 312 from the system clock 310 and connects the second oscillator 314 to the system clock 310. Additionally, in the example fifth state 1218, the example hardware wakeup controller 304 generates a signal and sends the signal to the activity detector 302. When the example activity detector 302 detects the signal, the fifth operating condition 1220 has been satisfied.

In the illustrated example of FIG. 12, in response to detecting the signal from the hardware wakeup controller 304, the example wakeup circuit 218 enters an example sixth state 1222. In the example sixth state 1222, the example activity detector 302 transmits a second notification to the external device. The second notification indicates the power delivery controller 202 has transitioned from the deep sleep mode of operation to the active mode of operation. Once the example activity detector 302 transmits the second notification, the example wakeup circuit 218 enters the example first state 1202.

Figure 13:
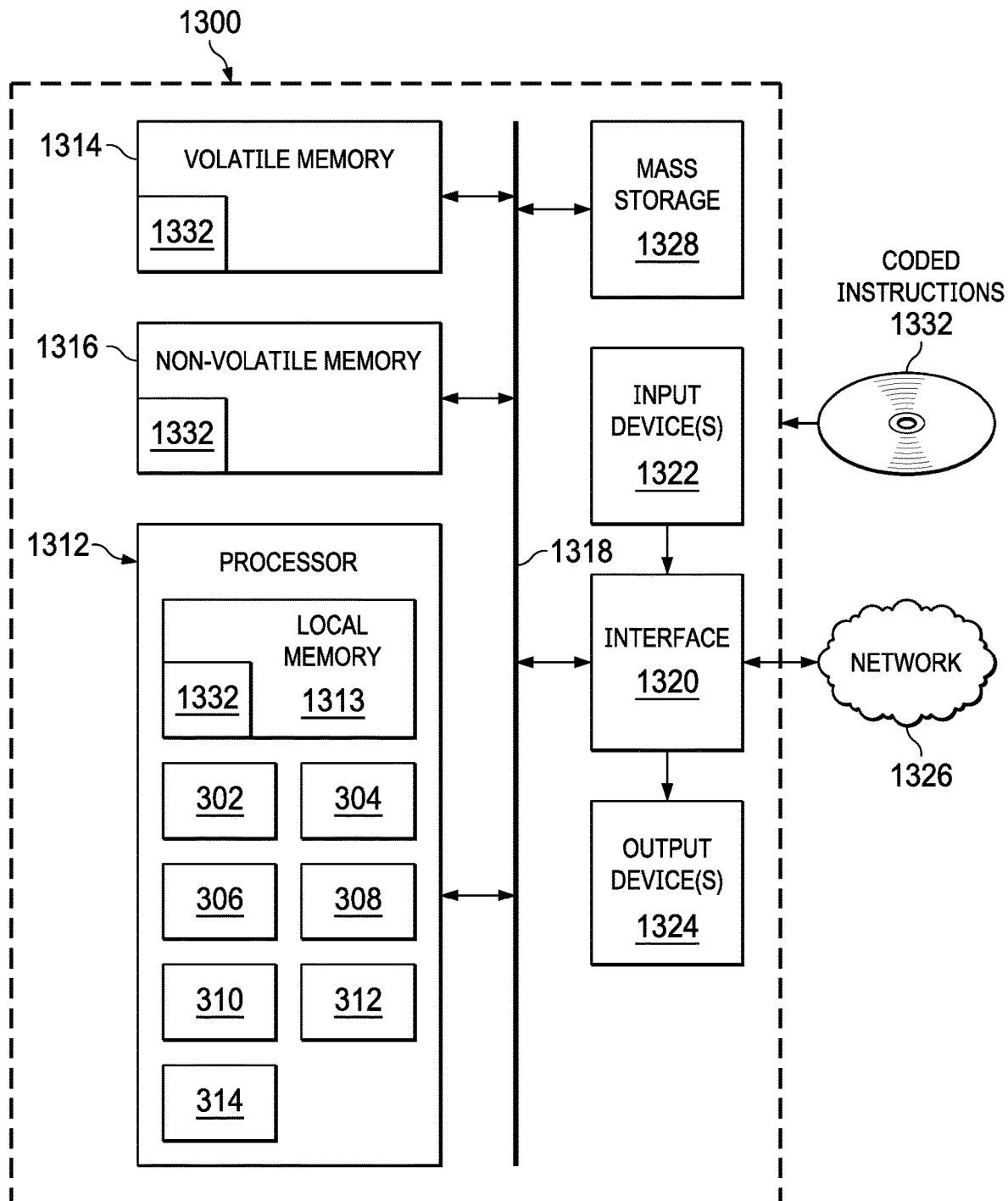
FIG. 13 is a block diagram of an example processing platform structured to execute the instructions of FIG. 10 to implement the wakeup circuit of FIGS. 3, 4, 5, and 7.

FIG. 13 is a block diagram of an example processor platform 1300 structured to execute the instructions of FIGS. 10 and 11 to implement the wakeup circuit 218 of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example activity detector 302, the example hardware wakeup controller 304, the example communication bus controller 306, the example glitchless switching circuit 308, the example system clock 310, the example first oscillator 312, the example second oscillator 314.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 10 and 11 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that reduce the amount of time taken to transition from a first operational mode to a second operational mode. Examples disclosed herein switch a system clock from a first oscillator to a second oscillator using a hardware wakeup controller that does not rely on the system clock speed. Because the hardware wakeup controller does not rely on the system clock speed, the hardware wakeup controller switches the system clock from the first oscillator to the second oscillator faster than alternative methods. For example, the disclosed methods, apparatus and article of manufacture allow computing devices to incorporate a sleep mode (e.g., a low frequency clock) to reduce power consumption while still allowing the computing devices to wakeup quickly (e.g., without losing communication bus transactions). The disclosed methods, apparatus and articles of manufacture improve the efficiency of using a computing device by reducing the length of time that the computing device is in a first operational mode and increasing the amount of time that the computing device can receive communications and requested actions. Furthermore, the disclosed methods, apparatus and articles of manufacture reduce the amount of time that a peripheral device occupies a communication bus (e.g., an I2C communication bus), thereby increasing the amount of time that a host device can access one or more other peripheral devices coupled to the communication bus. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A power delivery controller comprising:
a clock having a clock input and a clock output;
a bus address matcher circuit having first and second inputs, and having first and second outputs, wherein the first input is coupled to the clock output;
a bus activity detector controller having first, second, third, and fourth inputs, and having first and second outputs, wherein the first input is coupled to the first output of the bus address matcher circuit, and the second input is coupled to the clock output;
a bus address regenerator circuit having first, second, and third inputs, and having first and second outputs, wherein the first input is coupled to the first output of the bus activity detector controller, the second input is coupled to the clock output, the first output is coupled to the third input of the bus activity detector, and the second output is coupled to a communication bus;
a communication bus controller having an input and an output, wherein the input is coupled to the clock output, and the output is coupled to the second input of the bus address matcher circuit;
a hardware wakeup controller having first and second inputs, and having first, second, and third outputs, wherein the first input is coupled to the second output of the bus address matcher, and the first output is coupled to the third input of the bus activity detector controller;
a switching circuit having first, second, and third inputs, and having first and second outputs, wherein the first input is coupled to the second output of the hardware wakeup controller, the first output is coupled to the second input of the hardware wakeup controller, and the second output is coupled to the clock input;
a first oscillator having an output coupled to the second input of the switching circuit; and
a second oscillator having an input and an output, wherein the output is coupled to the third input of the switching circuit, and the input is coupled to the third output of the hardware wakeup controller.

2. The power delivery controller of claim 1, wherein the communication bus is an I2C bus, and including a switch having a control input coupled to the first output of the bus address matcher and having an output configured to pull a serial clock signal on the I2C bus to logic low when an address on the I2C bus matches a power delivery controller address.

3. The power delivery controller of claim 1, wherein the hardware wakeup controller includes a hardware state machine.

4. The power delivery controller of claim 1, wherein the first oscillator is configured to be operated at a first frequency and the second oscillator is configured to be operated at a second frequency different than the first frequency.

5. The power delivery controller of claim 4, wherein the clock is configured to selectively operate at the first frequency or the second frequency.

6. The power delivery controller of claim 4, wherein the first frequency is lower than the second frequency and the clock is configured to operate at a third frequency, wherein the third frequency is a function of the first frequency or the second frequency.

7. The power delivery controller of claim 1, wherein a third input of the bus address matcher is configured to be coupled to a requesting device.

8. The power delivery controller of claim 1, wherein the bus address matcher is configured to be coupled to at least one of a laptop computer, a desktop computer, a cellular phone, or a power supply.

9. A system comprising:
an activity detector including:
  a bus address matcher circuit having first and second inputs, and having first and second outputs, wherein the first input is coupled to a clock;
  a bus activity detector controller having first, second, third, and fourth inputs, and having first and second outputs, wherein the first input is coupled to the first output of the bus address matcher circuit, and the second input is coupled to the clock; and
  a bus address regenerator circuit having first, second, and third inputs, and having first and second outputs, wherein the first input is coupled to the first output of the bus activity detector controller, the second input is coupled to the clock, the first output is coupled to the third input of the bus activity detector, and the second output is coupled to a communication bus; and configured to:
    detect, on the communication bus, a request for an action from a first device;
    generate a first notification indicating the request is directed to a second device; and
    transmit a second notification to the first device indicating the action has been completed;
a switching circuit coupled to a first oscillator, a second oscillator and the clock; and
a hardware wakeup controller coupled to the activity detector and the switching circuit, and configured to, in response to detecting the first notification, switch the clock from the first oscillator to the second oscillator.

10. The system of claim 9, wherein the request may be an I2C communication to access the second device or a power supply negotiating a new Universal Serial Bus Type C contract.

11. The system of claim 9, wherein the communication bus is at least one of an I2C communication bus, a general purpose input output communication bus, or a power delivery communication bus.

12. The system of claim 9, wherein, the hardware wakeup controller is configured to:
enable the second oscillator;
monitor an output of the second oscillator to verify the second oscillator is on and the output is stable;
determine that the second oscillator is synchronized with the first oscillator;
in response to determining that the second oscillator is synchronized with the first oscillator:
  disconnect the clock from the first oscillator; and
  connect the clock to the second oscillator.

13. The system of claim 9, wherein the first oscillator is configured to operate at a first frequency and the second oscillator is configured to operate at a second frequency different than the first frequency.

14. The system of claim 13, wherein the first frequency is lower than the second frequency.

15. The system of claim 13, wherein a third frequency of the clock is a function of at least one of the first frequency or the second frequency.

16. The system of claim 9, wherein the bus activity detector is configured to be coupled to at least one of a laptop computer, a desktop computer, a cellular phone, or a power supply.

17. A method comprising:
detecting a request from a first device at a second device on a communication bus;
determining whether an address of the request matches an address of the second device;
generating, at the second device, a first notification responsive to if the address of the request matching the address of the second device;
switching a clock from a first oscillator to a second oscillator responsive to detecting the first notification; and
transmitting, from the second device, a second notification to the first device that indicates the second device has completed a function included in the request.

18. The method of claim 17, wherein switching the clock from the first oscillator to the second oscillator includes:
enabling the second oscillator, with a logic circuit;
monitoring an output of the second oscillator to verify the second oscillator is on and an output of the second oscillator is stable;
determining that the second oscillator is synchronized with the first oscillator;
in response to determining that the second oscillator is synchronized with the first oscillator:
  disconnecting the clock from the first oscillator; and
  connecting the clock to the second oscillator.

19. The method of claim 17, wherein the first oscillator is configured to operate at a first frequency and the second oscillator is configured to operate at a second frequency different than the first frequency.

20. The method of claim 19, wherein the first frequency is lower than the second frequency.

21. The method of claim 20, wherein a third frequency of the clock is a function of at least one of the first frequency or the second frequency.

* * * * *